United States Patent
Ito et al.

(10) Patent No.: US 9,729,777 B2
(45) Date of Patent: Aug. 8, 2017

(54) PHOTOGRAPHING APPARATUS AND CONTROL METHOD FOR PHOTOGRAPHING APPARATUS

(71) Applicant: Olympus Corporation, Shibuya-ku, Tokyo (JP)

(72) Inventors: Kazumi Ito, Fuchu (JP); Ryuhi Okubo, Asaka (JP)

(73) Assignee: Olympus Corporation, Tokyo (JP)

( * ) Notice: Subject to any disclaimer, the term of this patent is extended or adjusted under 35 U.S.C. 154(b) by 42 days.

(21) Appl. No.: 14/971,349

(22) Filed: Dec. 16, 2015

(65) Prior Publication Data

US 2016/0182811 A1     Jun. 23, 2016

(30) Foreign Application Priority Data

Dec. 22, 2014   (JP) ................ 2014-258922

(51) Int. Cl.
| | |
|---|---|
| H04N 5/232 | (2006.01) |
| H04N 5/369 | (2011.01) |
| G02B 7/34 | (2006.01) |
| G02B 7/36 | (2006.01) |

(52) U.S. Cl.
CPC .......... H04N 5/23212 (2013.01); G02B 7/34 (2013.01); G02B 7/36 (2013.01); H04N 5/23209 (2013.01); H04N 5/3696 (2013.01)

(58) Field of Classification Search
None
See application file for complete search history.

(56) References Cited

U.S. PATENT DOCUMENTS

| | | | |
|---|---|---|---|
| 8,416,336 B2 | 4/2013 | Utagawa et al. | |
| 8,605,198 B2* | 12/2013 | Ono | G02B 3/14 |
| | | | 348/340 |
| 2008/0084483 A1* | 4/2008 | Kusaka | H04N 5/23212 |
| | | | 348/222.1 |
| 2015/0264251 A1 | 9/2015 | Ito et al. | |

* cited by examiner

*Primary Examiner* — Mark T Monk
(74) *Attorney, Agent, or Firm* — John C. Pokotylo; Straub & Pokotylo

(57) ABSTRACT

A photographing apparatus of the present invention, having a lens section including a photographing optical system for guiding photographing light flux and a body section capable of being attached to and detached from the lens section, comprises an image sensor having imaging pixels and pairs of focus detection pixels, a first memory for storing information relating to incident angle range of imaging light flux, a second memory, arranged in the body section, for storing information on light receiving sensitivity characteristic of the focus detection pixels, and a control amount calculate section for calculating information for focus adjustment control based on information that has been read out from the first memory and the second memory, wherein the information relating to incident angle range includes information relating to shape of a plurality of arcs based on openings of a plurality of lens groups contained in the photographing optical system.

15 Claims, 17 Drawing Sheets

PHOTOGRAPHING APPARATUS AND CONTROL METHOD FOR PHOTOGRAPHING APPARATUS

Benefit is claimed, under 35 U.S.C. §119, to the filing date of prior Japanese Patent Application No. 2014-258922 filed on Dec. 22, 2014. This application is expressly incorporated herein by reference. The scope of the present invention is not limited to any requirements of the specific embodiments described in the application.

BACKGROUND OF THE INVENTION

1. Field of the Invention

The present invention relates to a photographing apparatus for carrying out focus adjustment using a phase difference AF (Auto Focus) method based on output of an image sensor having focus detection pixels, and to a control method for a photographing apparatus.

2. Description of the Related Art

An apparatus for forming a subject image that has been formed using an photographing optical system having focus detection pixels arranged at positions of some imaging pixels that are arranged two dimensionally, and also carrying out focus adjustment for the photographing optical system using a pupil-division phase difference method, is known. With an image sensor of this focus adjustment device, incident angles to photoelectric conversion elements of focus detection pixels, of pairs of light flux for focus detection that have passed through regions of differing exit pupils of the photographing optical system, vary with increasing distance from points of a light receiving surface of the image sensor that intersect the optical axis of the photographing optical system, and focus detection precision is lowered.

In order to prevent this lowering of focus detection precision, a focus adjustment apparatus has therefore been proposed that sets a positional relationship between positions of microlenses for pupil-division positions of focus detection pixels in accordance with image height of a light receiving surface of an image sensor (refer to Japanese Patent laid-open No. 2009-290157 (hereafter referred to as patent literature 1)). Correction in accordance with state of an optical system, using information on angles of upper end and lower end of light flux incident on an imaging surface of an image sensor, has also been proposed (refer to Japanese patent laid-open No. 2014-122993 (hereafter referred to as patent literature 2)).

With above described patent literature 1, it is possible to reduce error due to image height of focus detection pixels. However, since an AF characteristic varies depending on not only image height but also states such as focal length, focus position and aperture etc. of a photographing optical system, it is necessary to perform correction in accordance with states of the optical system. With patent literature 2 described above, when correcting in accordance with states of the optical system, using information on angle of upper end and lower end of light flux incident on an imaging surface, a cross sectional shape of the light flux appears circular. However, although it is possible to make the cross sectional shape of the light flux substantially circular at central parts of a screen in an actual optical system, if light flux to the periphery of a screen is considered this is not really true, and errors arise due to the effect of the cross sectional shape of the light flux.

SUMMARY OF THE INVENTION

An object of the present invention is to provide a photographing apparatus capable of carrying out optimum correction in accordance with states of a photographing lens and an image sensor, and a control method for the photographing apparatus.

A photographing apparatus of the present invention, having a lens barrel including a photographing optical system for guiding photographing light flux and a camera body capable of being attached to and detached from the lens barrel, comprises an image sensor having imaging pixels and pairs of focus detection pixels, a first memory, provided in the lens barrel, for storing information relating to incident angle range of imaging light flux on the image sensor, a second memory, arranged in the camera body, for storing information on light receiving sensitivity characteristic of the focus detection pixels, and a control amount calculate section for calculating information for focus adjustment control based on information that has been read out from the first memory and the second memory, wherein the information relating to the incident angle range includes information relating to shape of a plurality of arcs based on openings of a plurality of lens groups included in the photographing optical system, and the control amount calculation step calculates the incident angle range of the light flux that is incident on the focus detection pixels based on the information relating to the incident angle range, wherein the information relating to the incident angle range includes information relating to shape of a plurality of arcs based on openings of a plurality of lens groups included in the photographing optical system, and the control amount calculate section calculates the incident angle range of the light flux that is incident on the pixels for focus detection based on the information relating to the incident angle range.

A control method for a photographing apparatus of the present invention, the photographing apparatus comprising a lens barrel including a photographing optical system for guiding photographing light flux, a camera body capable of being attached to and detached from the lens barrel, an image sensor having imaging pixels and pairs of focus detection pixels, a first memory, provided in the lens barrel, for storing information relating to incident angle range of imaging light flux on the image sensor, and a second memory, arranged in the camera body, for storing information on light receiving sensitivity characteristic of the focus detection pixels, the control method comprising a control amount calculation step for calculating information for focus adjustment control based on information that has been read out from the first memory and the second memory, wherein the information relating to the incident angle range includes information relating to shape of a plurality of arcs based on openings of a plurality of lens groups included in the photographing optical system, and the control amount calculation step calculates the incident angle range of the light flux that is incident on the focus detection pixels based on the information relating to the incident angle range.

DETAILED DESCRIPTION OF THE PREFERRED EMBODIMENTS

A preferred embodiment using a digital camera (hereafter abbreviated to camera) to which the present invention has been applied will be described in the following in accordance with the drawings. Before describing the specific structure of this embodiment, AF sensitivity used for focus detection, and causes of variation in AF sensitivity, will be described.

Figure 1:
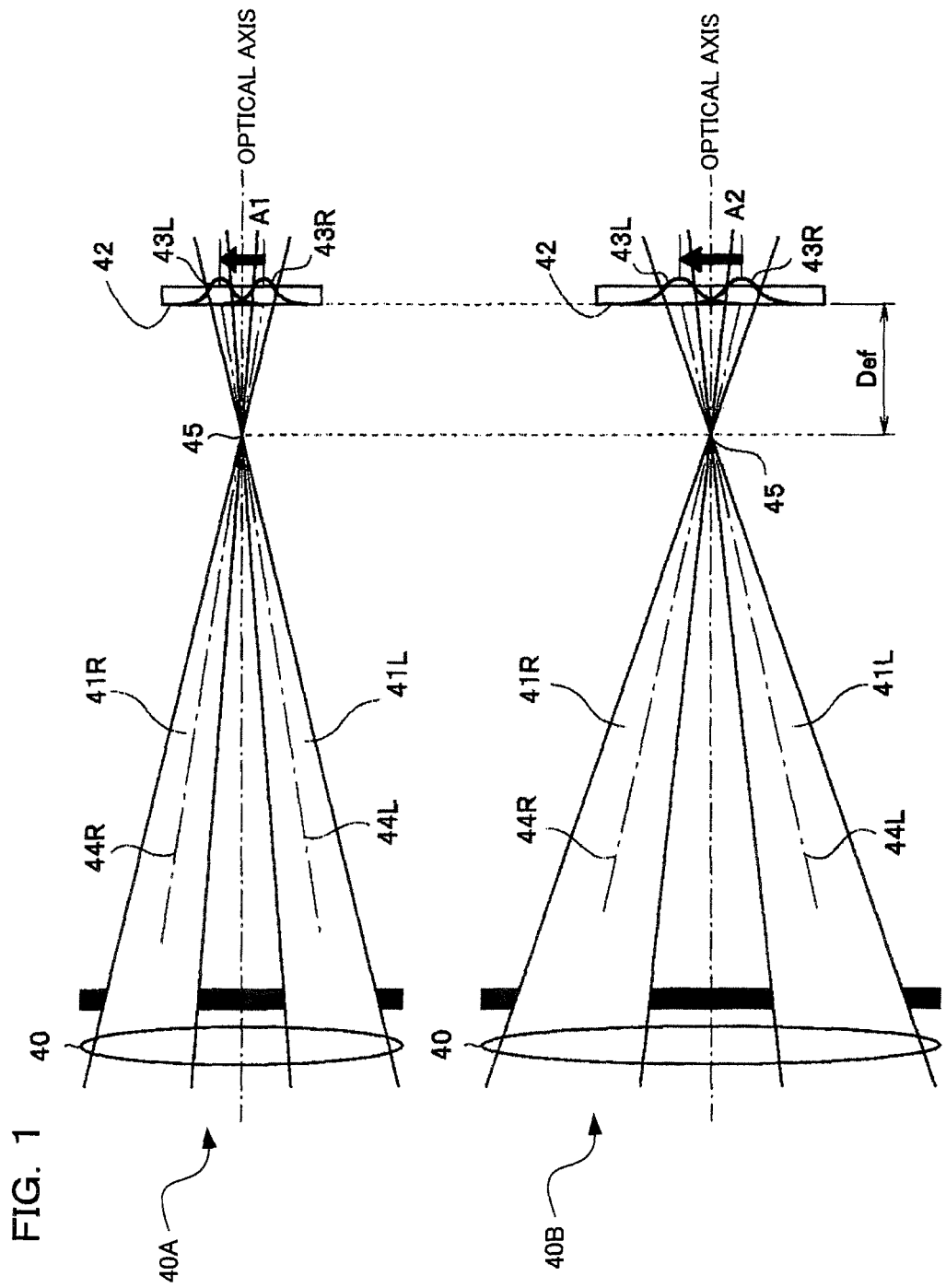
FIG. 1 is a drawing for explaining a relationship between F value (F number, FNo) and 2 images in a pupil-division phase difference method, with one embodiment of the present embodiment.

FIG. 1 is a drawing for explaining a relationship between F value (F number) and two-image interval, in a pupil-division phase difference method. The upper portion 40A in FIG. 1 shows an example for a case where F value is large, while the lower portion 40B in FIG. 1 shows an example for a case where F value is small. FIG. 1 shows appearance when right luminous flux 41R and left luminous flux 41L used in a pupil-division phase difference method are incident on an imaging surface 42. In FIG. 1 apertures are depicted on the optical axis in the vicinity of a lens since it is a theoretical description, but in actual fact there is an optical system (mechanism) for dividing light flux for pupil-division within the image sensor.

In a pupil-division phase difference method, each light path from a subject is divided into a left direction and a right direction, for example, at exit pupils, and light flux from the right direction (right light flux) and light flux from a left direction (left light flux) are incident on an imaging surface (light receiving surface) of the image sensor. Pixels for receiving the right light flux (hereafter referred to as R pixels) and pixels for receiving the left light flux (hereafter referred to as L pixels) are formed on the image sensor, and the left light flux and right light flux are respectively imaged on respective imaging surfaces of the R pixels and the L pixels.

In FIG. 1, a right image 43R resulting from right luminous flux 41R incident via the lens 40 is acquired using R pixels, and a left image 43L resulting from left luminous flux 41L is obtained using L pixels. An amount of displacement and direction of displacement between the right image 43R and the left image 43L on the imaging surface 42 correspond to defocus amount and defocus direction. A distance on the imaging surface 42 between a principal ray 44R of the right luminous flux 41R and a principal beam 44L of the left luminous flux 41L is a two-image interval A1 (the filled arrow), and the two-image interval A1 is proportional to a distance between the imaging surface 42 and focal point 45 (defocus amount). This proportionality coefficient is AF sensitivity, and if AF sensitivity for the upper portion 40A in FIG. 1 is made α1, then defocus amount Def can be represented by Def=α1×A1.

The two-image interval can be obtained from outputs of the R pixels and the L pixels, and so if AF sensitivity is obtained it is possible to calculate defocus amount. AF sensitivity can be obtained from AF operation parameters based on characteristics of the lens and the image sensor.

The lower portion 40B of FIG. 1 shows an example of a case where effective aperture of the lens 40 has been changed compared to the upper portion 40A of FIG. 1. Examples are shown where defocus amount Def in the lower portion 40B of FIG. 1 coincides with the defocus amount Def in the upper proportion 40A of FIG. 1. If a two-image interval for the lower portion 40B in FIG. 1 is made A2 and AF sensitivity obtained from AF operation parameters is made α2, then the defocus amount def can be represented by Def=α2×A2.

The examples in the upper portion 40A and the lower portion 40B of FIG. 1 show that the two-image interval changes in accordance with F value even if defocus amount Def is constant. Specifically, the examples of FIG. 1 show that AF sensitivity changes in accordance with F value, and show that it is possible to use effective aperture information, for example F value, as AF operation parameters for obtaining AF sensitivity. That is, with the examples of FIG. 1, it is possible to calculate defocus amount from information on the two-image interval and the F value.

However, the F value is defined by a ray on the optical axis. This means that with the present embodiment, to express effective aperture of light flux for focus detection pixels that are located off the optical axis, information on a value for F value equivalent (CF value) is used as an AF operation parameter for any peripheral light flux.

Figure 2A:
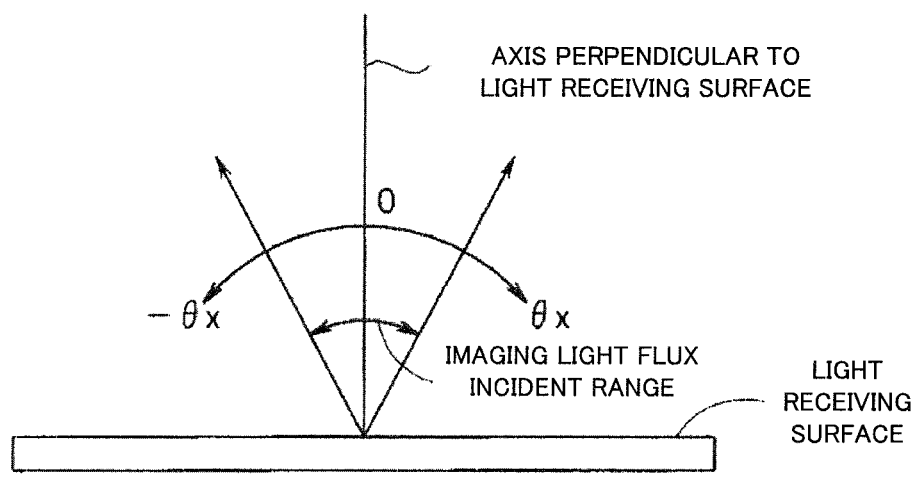
FIG. 2A and FIG. 2B are drawings for explaining a sensitivity characteristic of focus detection pixels with the one embodiment of the present invention.
Figure 2B:
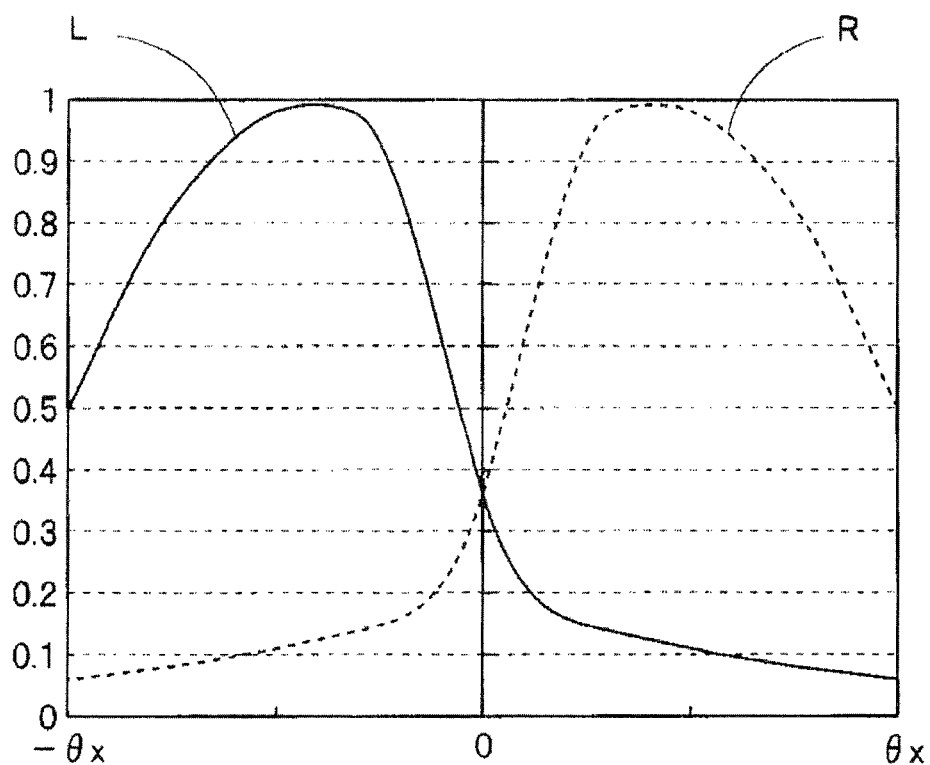

FIG. 2A and FIG. 2B are explanatory drawings for describing light receiving sensitivity characteristics of the focus detection pixels. FIG. 2A shows a range of incident angle (ray incident angle θx), in a pupil-division direction, for light flux (imaging light flux) incident on a light receiving surface. As shown in FIG. 2A, a ray incident angle θx is shown as an angle in positive and negative directions between an axis that is perpendicular to the light receiving surface and the ray incident angle, with an axis that is perpendicular to the light receiving surface made 0°.

FIG. 2B respectively shows light receiving sensitivity characteristics for L pixels that receive left light flux that has passed through a left pupil, and R pixels that receive right light flux that has passed through a left pupil, as a solid line L and a dotted line R, with the horizontal axis representing ray incident angle θ and the vertical axis representing light receiving sensitivity. FIG. 2B shows light receiving sensitivity characteristics of focus detection pixels that are positioned on the optical axis, and light receiving sensitivity characteristics for L pixels and R pixels are substantially symmetrical about a ray incident angle 0.

Figure 3:
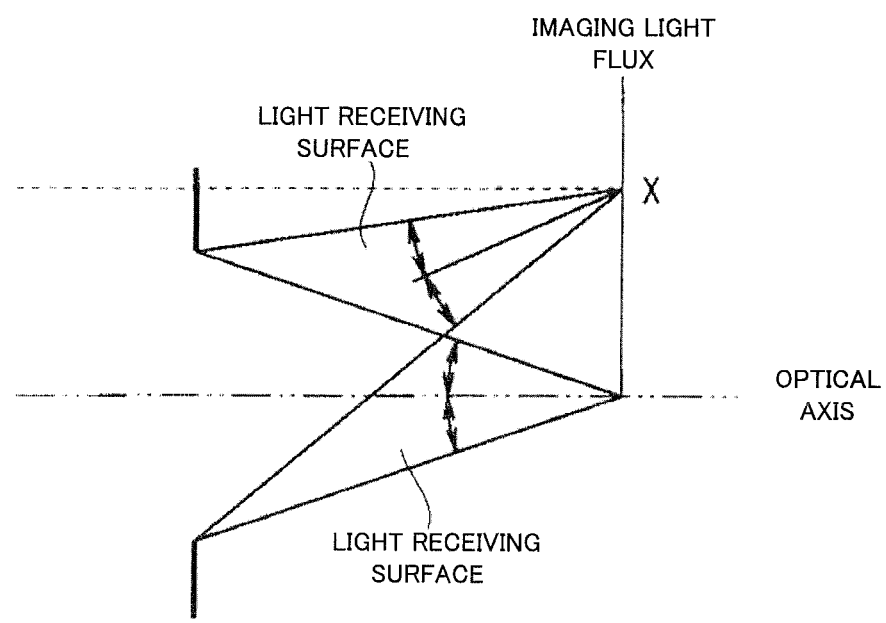
FIG. 3 is a drawing for explaining states of incident angle of imaging light flux on off-axis focus detection pixels.

As shown in FIG. 3, there may be cases where light flux that is off-axis is inclined with respect to the optical axis. With AF operation that uses these types of off-axis focus detection pixels, it is necessary to calculate an AF sensitivity that is different to the AF sensitivity used for light flux on the optical axis. In order to calculate AF sensitivity, it is necessary to obtain a range of light flux, but it is not possible to acquire appropriate AF sensitivity using only a corrected F value representing width of the light flux, and a value that represents the inclination of the light flux is also necessary.

Light receiving sensitivity of the focus detection pixels have an angular characteristic in the pupil-division direction. With this embodiment, AF sensitivity is calculated from angular range of the imaging light flux and angular characteristic of the focus detection pixels. Specifically, with this embodiment, information on sensitivity of the L and R pixels, and information relating to angular range of imaging light flux that is incident on the L and R pixels (corrected F value representing width of the light flux, and inclination of the light flux) are used as AF operation parameters for obtaining appropriate AF sensitivity.

Figure 4:
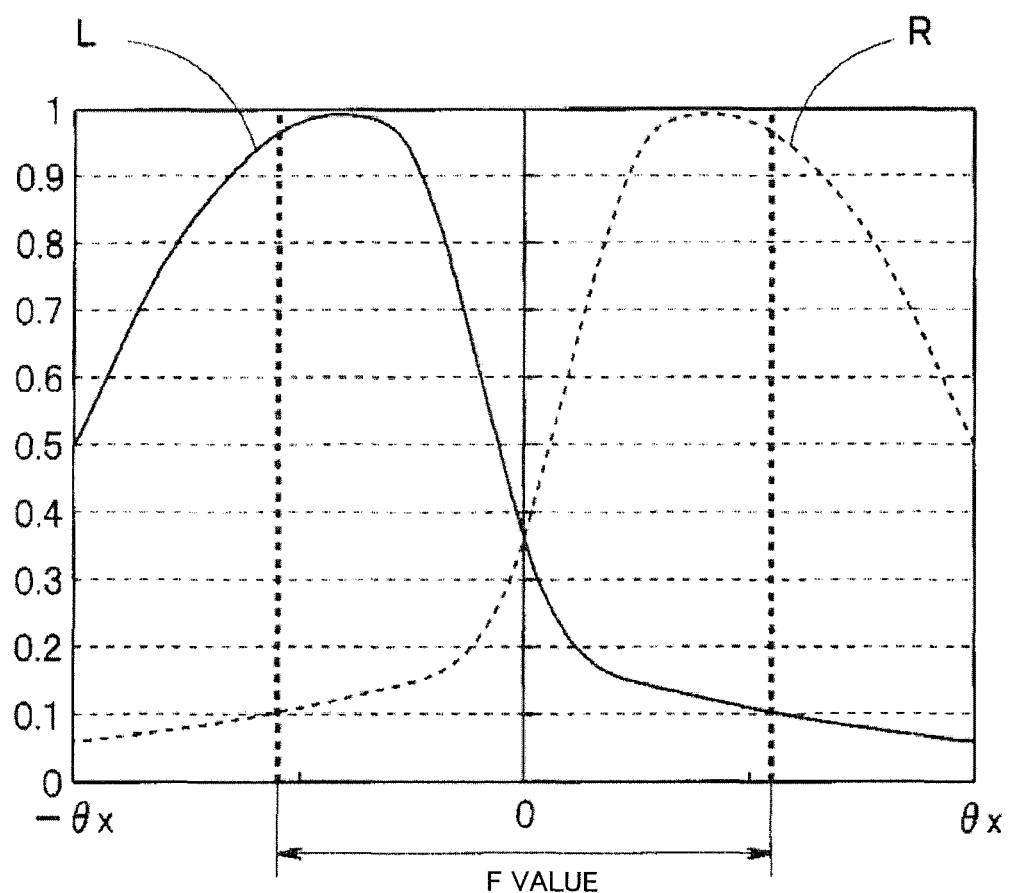
FIG. 4 is a drawing for explaining a relationship between imaging light flux angle range and AF sensitivity, for focus detection pixels that are on the optical axis, with the one embodiment of the present invention.
Figure 5:
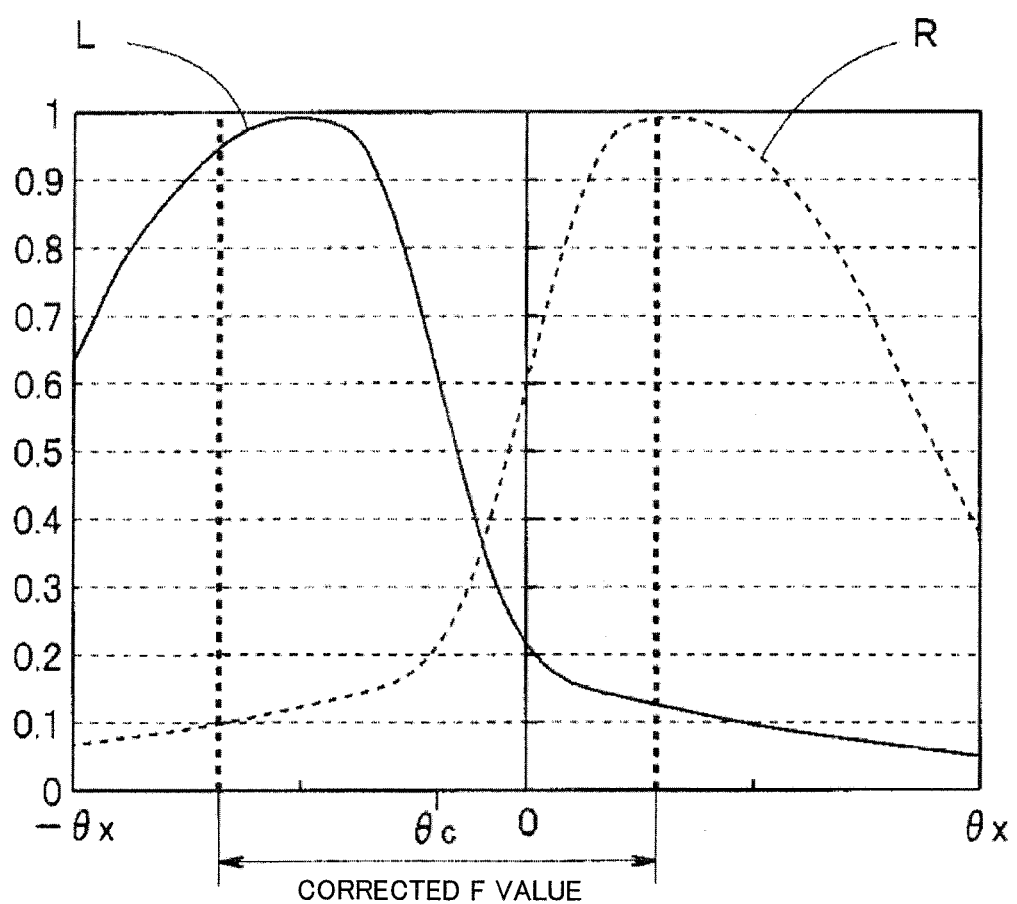
FIG. 5 is a drawing for explaining a relationship between imaging light flux angle range and AF sensitivity, for off-axis focus detection pixels, with the one embodiment of the present invention.

FIG. 4 and FIG. 5 are explanatory drawings for describing a relationship between angular range of imaging light flux and AF sensitivity. FIG. 4 shows a relationship for focus detection pixels that are on the optical axis, while FIG. 5 shows the relationship for focus detection pixels that are off the optical axis, and for focus detection pixels that are off the optical axis a light receiving sensitivity characteristic for L pixels and R pixels is a non-symmetrical characteristic.

As shown in FIG. 4, imaging light flux in an angular range shown by the thick dotted lines, for example, is incident on the focus detection pixels that are on the optical axis. As shown in FIG. 4, this imaging light flux is left right symmetrical with respect to the optical axis, and an angle difference between maximum incident angle and minimum incident angle corresponds to F value.

Also, maximum incident angle and minimum incident angle of imaging light flux for off-axis focus detection pixels is shifted in accordance with image height X shown in FIG. 3, resulting in an angular range shown by the thick dotted lines in FIG. 5, for example. An angle difference between maximum incident angle and minimum incident angle of the imaging light flux in this case actually corresponds to corrected F value, although this has been omitted from FIG. 3. This means that it is possible to acquire information on maximum incident angle and a minimum incident angle of the imaging light flux using the corrected F value and incident angle of a ray that passes through the center of the imaging light flux (hereafter referred to as imaging light flux incident angle).

With this embodiment, in order to make computation simple, a range of light flux that is incident on the focus detection pixels is obtained using information on the corrected F value and the imaging light flux incident angle (central direction of the imaging light flux), and AF sensitivity is obtained using this range. In this case, due to the effects of aberration of an optical system between the aperture and the light receiving surface etc., incident angle of the imaging light flux that is incident on the imaging surface at a specified image height differs for each optical system. With this embodiment, therefore, information on imaging light flux incident angle corresponding to image height of the light receiving surface, that is acquired for the optical system, is used as an AF operation parameter.

Figure 6A:
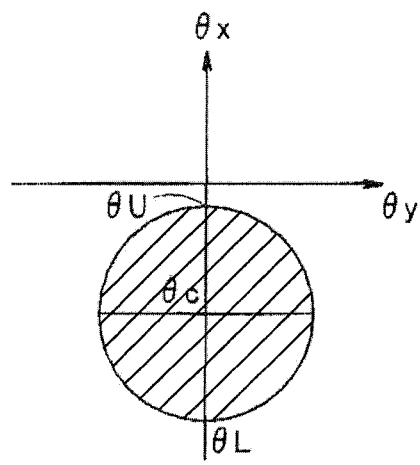
FIG. 6A and FIG. 6B are drawings for explaining effective aperture and imaging light flux incident angle θc, which is a central direction of imaging light flux, for incident light flux that is incident on focus detection pixels of image height X, with the one embodiment of the present invention.
Figure 6B:
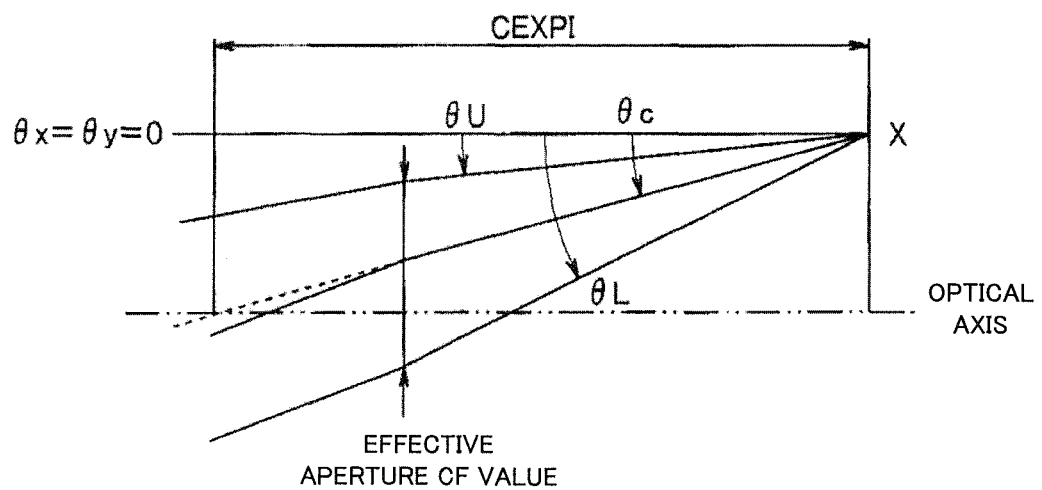

FIG. 6A and FIG. 6B are drawings for explaining effective aperture (corrected F value) and imaging light flux incident angle θc, which is a central direction of imaging light flux, for incident light flux that is incident on focus detection pixels of image height X. FIG. 6A shows angular range of a pupil seen from image height X. In the image height X direction the imaging light flux exists in a range from incident angle $θ_L$ to $θ_U$, and the center of the range is imaging light flux incident angle θc.

Further, ray incident angle to the light receiving surface has a one-to-one correspondence to a position of an intersection point of a ray that passes through the center of the imaging light flux (the dotted line in FIG. 6B) and the optical axis. A rate of change in this position is comparatively small compared to rate of change of the imaging flux incident angle θc. This enables high precision control with a comparatively small number of bits, by using information on this position instead of the information on the imaging light flux incident angle θc. With this embodiment, this position, namely a position where a straight line passing through the center of the imaging light flux crosses the optical axis, will be referred to as corrected exit pupil position (CEXPI). It should be noted that this position is different from exit pupil position that is defined as a paraxial amount.

The corrected exit pupil position (CEXPI) can be expressed by the following equation (1), and corrected F value (CF) can be expressed by the following equation (2).

Tan θc=(Tan θU+Tan θL)/2

$$CEXPI = x/\text{Tan } θc \quad (1)$$

$$CF = \text{Tan } θL - \text{Tan } θU \quad (2)$$

Thus, with this embodiment, the corrected F value (CF) and information on corrected exit pupil position (CEXPI) that has been corrected in accordance with image height are used as the AF operation parameters. These items of information have different values for each optical system, and so information from the optical system is utilized. Also, since, depending on the value of the imaging light flux incident angle θc, the corrected exit pupil position (CEXPI) may become infinity, a reciprocal value of the corrected exit pupil position (CEXPI) is preferably used as AF operation parameter.

With this embodiment, information on corrected F value (CF value) that has been corrected in accordance with image height and corrected exit pupil position (CEXPI) that has been corrected in accordance with image height are used as AF operation parameters at the camera lens side, and a light receiving sensitivity characteristic of the focus detection pixels is used as the AF operation parameter at the camera body side. The AF operation parameters at the lens side are values that are inherent to the lens side based on optical design, while the AF operation parameters at the body side are values inherent to the body side based on design of the image sensor. Accordingly, by respectively holding these AF operation parameters at the lens side and the body side, it is possible to use the lens side and body side AF operation parameters even in a case where the type of the lens side and the body side is changed, and high precision AF operation becomes possible.

Figure 7A:
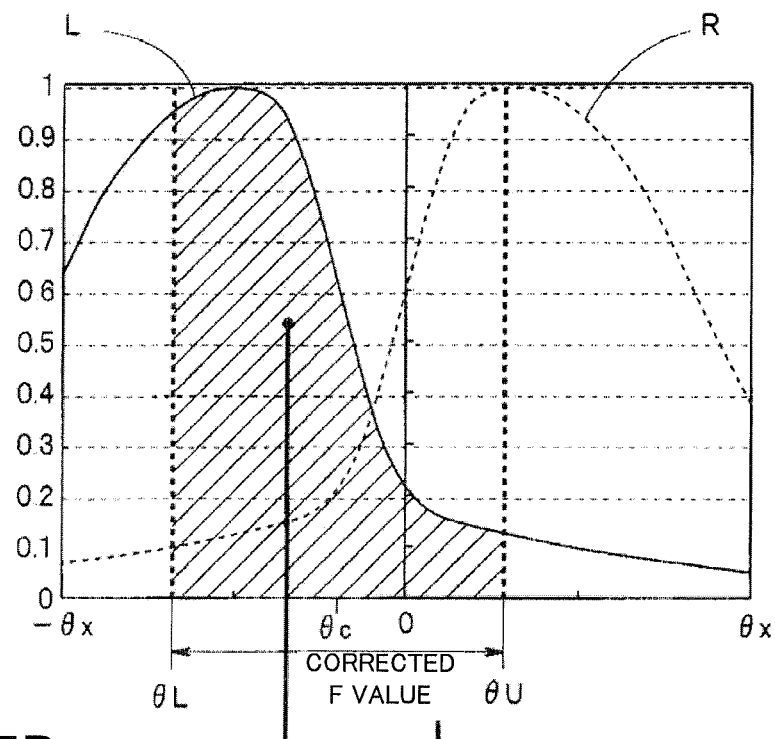
FIG. 7A and FIG. 7B are drawings for explaining a relationship between sensitivity and imaging light flux incident angle range of focus detection pixels of image height X that are not on the optical axis, and AF sensitivity, with the one embodiment of the present invention.
Figure 7B:
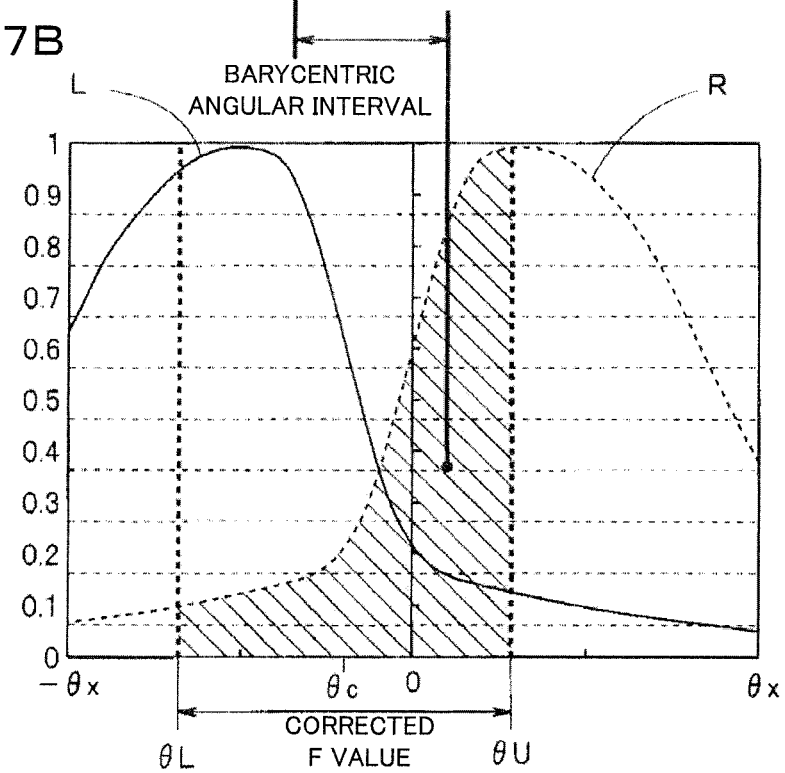

FIG. 7A and FIG. 7B are explanatory drawings for explaining a relationship between light receiving sensitivity and imaging light flux incident angle range, and AF sensitivity, of focus detection pixels of image height X that are not on the optical axis. A solid line L represents light receiving sensitivity of the L pixels, and a dotted line R represents light receiving sensitivity of the R pixels. Imaging light flux is incident on the focus detection pixels shown by the sensitivity characteristic of FIG. 7A and FIG. 7B in an angular range of the heavy dashed lines. Specifically, FIG. 7A and FIG. 7B show that the imaging light flux is incident only in an angular range corresponding to the corrected F value (cf. value), with imaging light flux incident angle θc as a center.

Light receiving amount for the L pixels can be represented by the shaded area in FIG. 7A. Also, light receiving amount for the R pixels can be represented by the shaded area in FIG. 7B. It can be considered that a barycentric position of the shaded region in FIG. 7A corresponds to incident direction of the left light flux, while a barycentric position of the shaded region in FIG. 7B corresponds to incident direction of the right light flux. An angular interval between these barycentric positions (barycentric angular interval) can be considered to be proportional to AF sensitivity.

Specifically, barycentric angular intervals GL and GR can be represented by equations (3) and (4) below, and AF sensitivity (AFsen) can be represented by the equation (5) below in which interval of barycentric angle has been multiplied by a specified constant A. Here, light receiving sensitivity characteristics for the L pixels and R pixels are respectively made fL and fR. It should be noted that in actual fact, as shown by the shaded area in FIG. 6A, since light flux has two dimensions of θx and θy, barycentric angle GL is represented by equation (6) (the same is true for barycentric angle GR and so this has been omitted).

$$GL = \frac{\int_{\theta L}^{\theta U} f_L(\tan\theta x)\cdot \tan\theta x \cdot d\tan\theta x}{\int_{\theta L}^{\theta U} f_L(\tan\theta x)\cdot d\tan\theta x} \quad (3)$$

$$GR = \frac{\int_{\theta L}^{\theta U} f_R(\tan\theta x)\cdot \tan\theta x \cdot d\tan\theta x}{\int_{\theta L}^{\theta U} f_R(\tan\theta x)\cdot d\tan\theta x} \quad (4)$$

$$AF_{sen} = |GL - GR| \times A \,(A \text{ is constant}) \quad (5)$$

$$GL = \frac{\int\int_{\theta L}^{\theta U} f_L(\tan\theta x, \tan\theta y)\cdot \tan\theta x \cdot \tan\theta y \cdot d\tan\theta x \cdot d\tan\theta y}{\int\int_{\theta L}^{\theta U} f_L(\tan\theta x, \tan\theta y)\cdot d\tan\theta x \cdot d\tan\theta y} \quad (6)$$

FIG. 7A and FIG. 7B show light receiving sensitivity characteristics for focus detection pixels of a specified image height, but the light receiving sensitivity characteristic changes in accordance with image height. Accordingly, at the body side, information on the light receiving sensitivity characteristic for focus detection pixels of each image height are stored, and utilized.

Also, surface area of the shaded regions in FIG. 7A and FIG. 7B corresponds to received light amount of each of the L and R pixels. If there is a difference in received large amount of L and R pixels for the same subject, then an L image based on the L pixels and an R image based on the R pixels will be different, making detection of a two-image interval difficult. Detection of the two-image interval is therefore made easy by subjecting L and R image signals to luminance correction (shading correction) in accordance with surface area of the shaded regions of FIG. 7A and FIG. 7B.

Surface area SL of the shaded portion of FIG. 7A and surface area of the shaded portion FIG. 7B can be represented by equations (7) and (8) below, and a luminance correction coefficient (LCC) can be represented by equation (9) below, for example. Luminance correction is carried out by multiplying output of the L pixels by this luminance correction coefficient (LCC). It should be noted that in actual fact, as shown by the shaded area of FIG. 6A, since light flux has two dimensions of θx and θy, surface area SL is represented by the equation (10) (the same applies to the surface area X, and so this is omitted).

$$SL = \int_{\theta L}^{\theta U} f_L(\tan\theta x)\cdot d\tan\theta x \quad (7)$$

$$SR = \int_{\theta L}^{\theta U} f_R(\tan\theta x)\cdot d\tan\theta x \quad (8)$$

$$LCC = SR/SL \quad (9)$$

$$SL = \iint f_L(\tan\theta x, \tan\theta y)\cdot d\tan\theta x \cdot d\tan\theta y \quad (10)$$

Figure 9A:
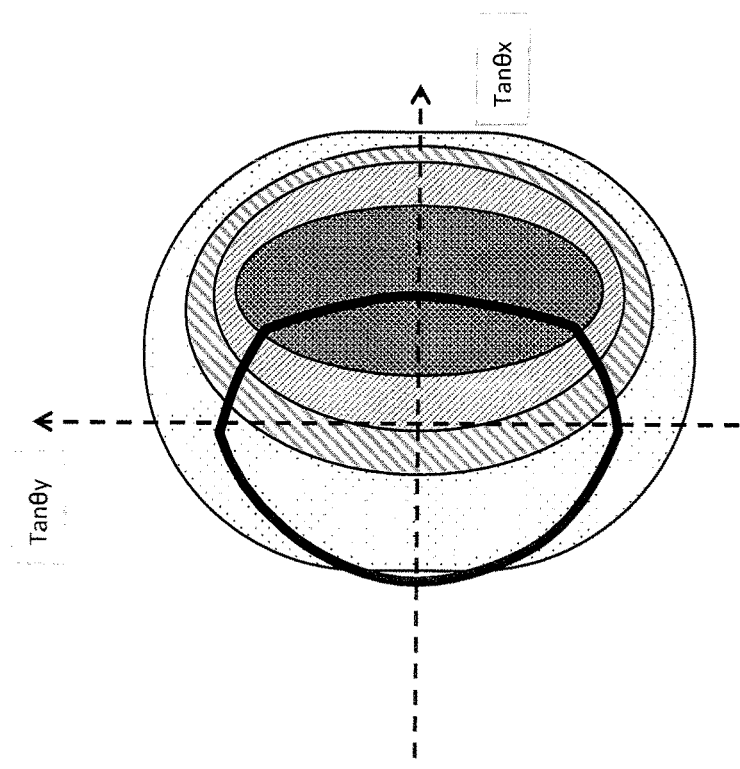
FIG. 9A and FIG. 9B show sensitivity characteristic of focus detection pixels and angle range of imaging light flux for image height not on the optical axis, with the one embodiment of the present invention.
Figure 9B:
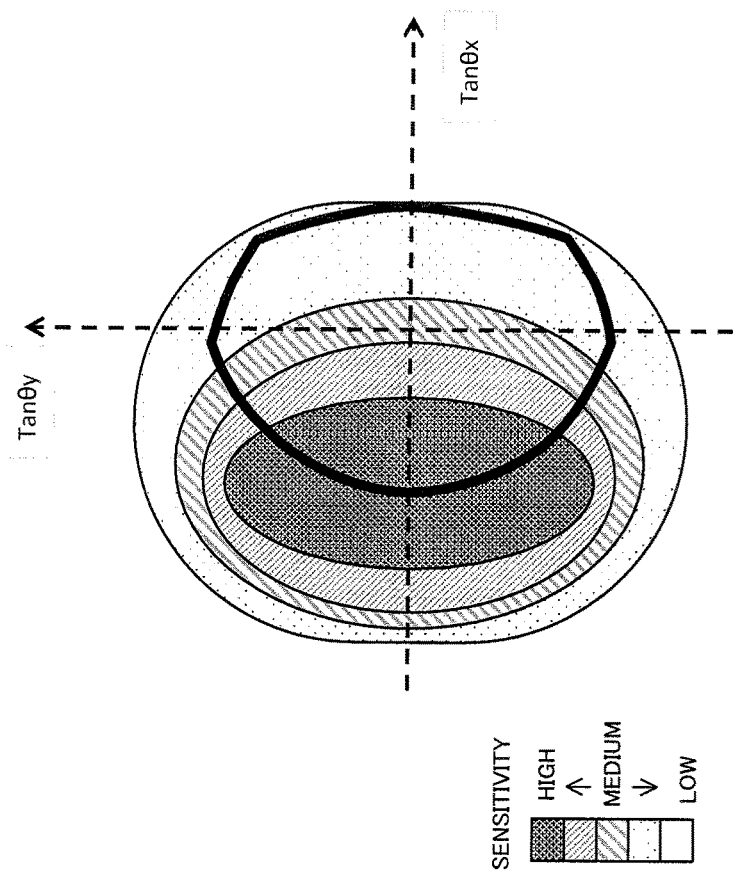

Up to now, in order to simplify the description, description has been given with a cross-section in the pupil-division direction, but as described previously the pupil has two dimensions of θx and θy, and the light receiving sensitivity characteristic of the focus detection pixels similarly has two dimensions. FIG. 9A and FIG. 9B are for showing this two dimensionality, with FIG. 9A showing a sensitivity characteristic for the L pixels, and FIG. 9B showing a sensitivity characteristic for the R pixels, in contoured form that also includes the θy direction. Here, the vertical axes respectively show Tan of angle θ.

In patent literature 2, the shape of a pupil was simplified to appear as a circle. It is possible to make the shape of a pupil appear substantially circular at the central portion of the screen in an actual optical system, but if light flux at the periphery of the screen is considered, this is not the case and it is necessary to also consider the effects of deformation of the pupil shape, as shown by the heavy solid lines in FIG. 9A and FIG. 9B. With this embodiment, with respect to this point, measurement precision at the screen periphery is improved by effectively defining a more accurate pupil shape.

Figure 8A:
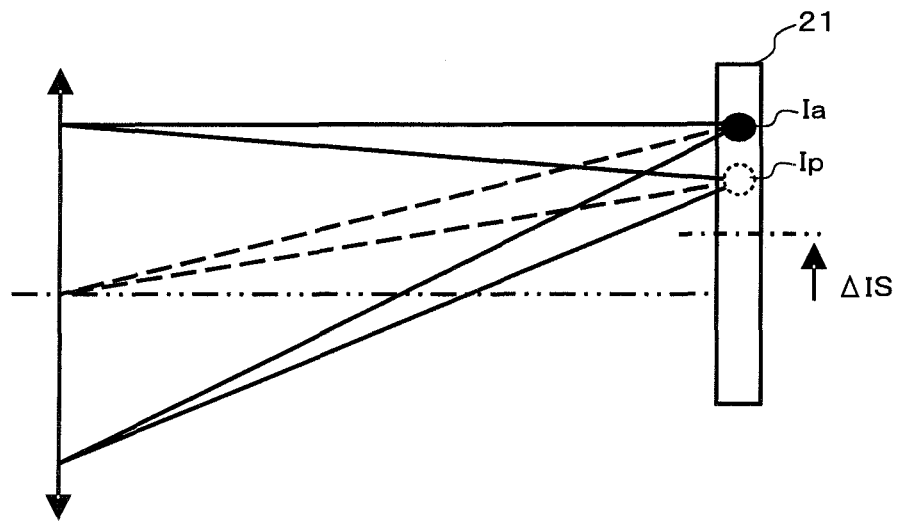
FIG. 8A and FIG. 8B are drawings for explaining the effect of image height in a case where an image sensor has been moved by a vibration prevention section, with the one embodiment of the present invention.
Figure 8B:
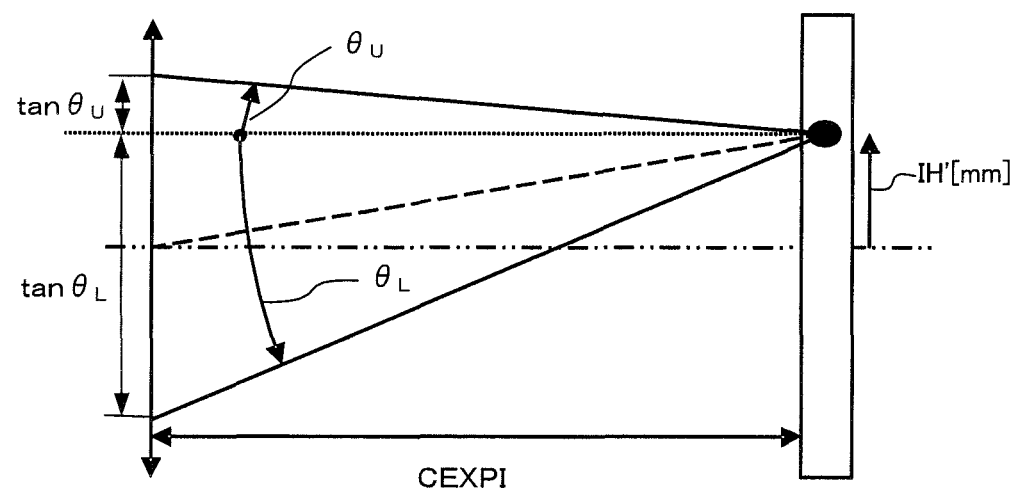

FIG. 8A and FIG. 8B are drawings for describing the effect on image height of an image sensor due to an image stabilize mechanism. At the time of actuation of the image stabilize mechanism, the effect of the image stabilize appears the same as when image height has changed from an optical aspect. Image height is therefore calculated taking into consideration parts that move because of the image stabilize mechanism. FIG. 8A shows appearance where the image stabilize mechanism is activated and the image sensor 21 moves upwards by ΔIS. At this time, a ranging point moves from ranging point Ip before ΔIS movement to ranging point Ia, if viewed with position of the optical system as a reference.

Image height correction at the time of activation of the image stabilize mechanism involves obtaining movement amount ΔIS due to the image stabilize mechanism at the time of ranging, and from this obtaining ranging image height IH' (image height of a ranging point) at the time of image stabilize mechanism drive using equation (11) below.

$$IH' = IH + \Delta IS \quad (11)$$

A pupil shape parameter is obtained with IH' that has been obtained by equation (11) above.

Figure 10:
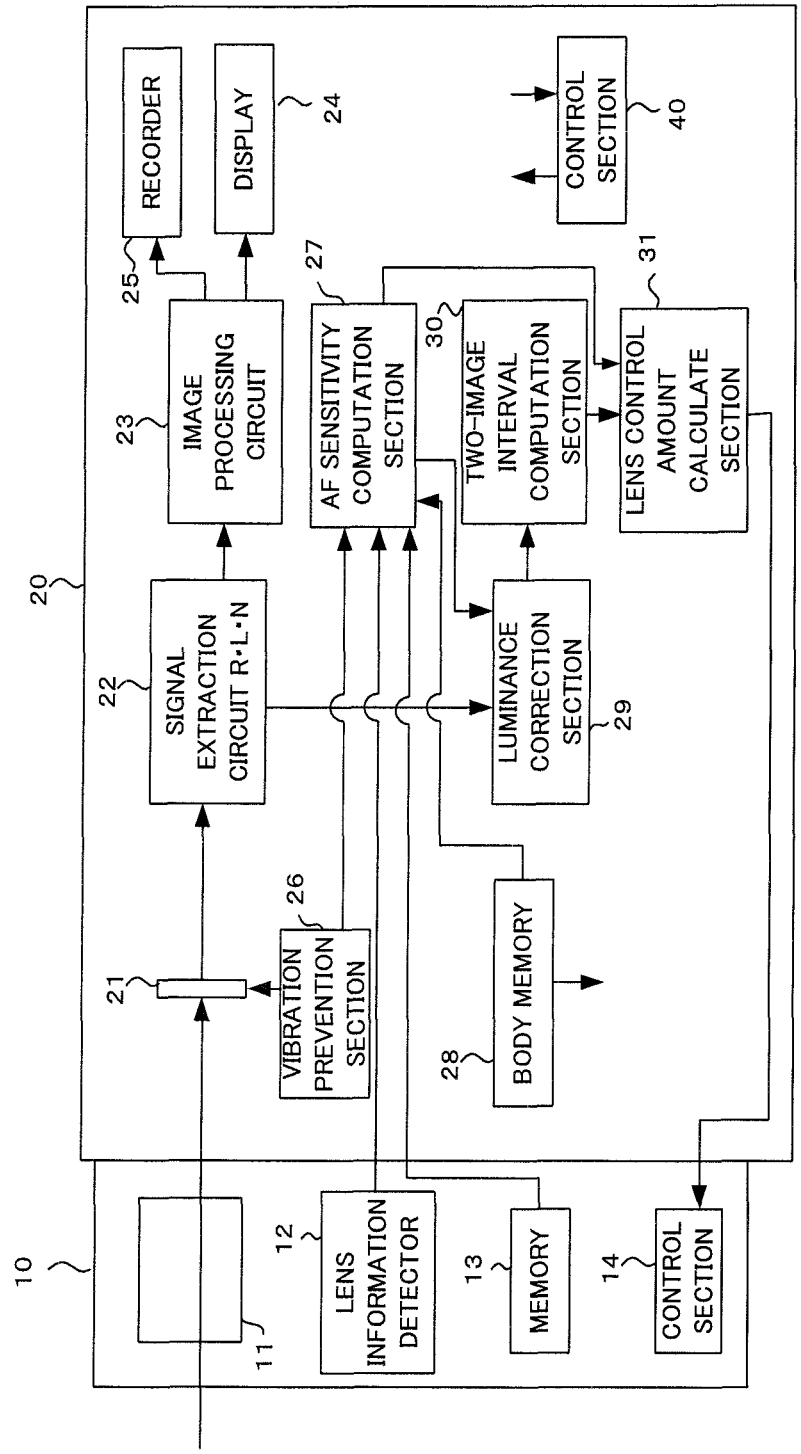
FIG. 10 is a block diagram mainly showing the electrical structure of a camera of one embodiment of the present invention.

Next, the structure of this embodiment will be described using FIG. 10. A camera of this embodiment comprises a camera body 20 constituting main circuitry, and a lens barrel 10 capable of being mounted to a chassis of the camera body section. It should be noted that the lens barrel 10 may be of a type that is fixed to the camera body 20.

The lens barrel 10 is provided with an optical system 11 a lens information detector 12, a memory 13, and the controller 14. The optical system 11 guides an optical image of a subject to an imaging surface of the image sensor 21 of the camera body 20. The optical system 11 has a lens, not shown, and provides a focus drive function for focusing by performing drive control for the lens using the controller 14. The optical system 11 may also have a zoom function. A prime photographing lens may be adopted as the lens barrel 10.

The optical system 11 also has a diaphragm, not shown, and amount of subject light flux that passes within the photographing lens is controlled by controlling opening diameter of the diaphragm. If the opening diameter of the diaphragm is changed, incident angle of the subject light flux is also changed.

A lens information acquisition section 12 within the lens barrel 10 detects lens state information within the lens barrel 10, for example, zoom position (Zmenc) of the optical system, focus position (subject distance, IO) of the optical system, aperture value (F value), and outputs this detected lens state information to the camera body 20.

The memory 13 within the lens barrel 10 is an electrically rewritable non-volatile memory such as flash memory, and stores various information relating to the lens barrel 10 such as, for example, information relating to diaphragm position, diaphragm diameter, exit pupil position, exit pupil diameter, focus lens position, and vignetting due to image height and direction. The memory 13 also stores information on corrected F value (CF value) and corrected exit pupil position (CEXPI) according to lens state as AF operation parameters.

The memory 13 functions as a first memory for storing information relating to incident angle range of the imaging light flux. Information relating to incident angle range includes information relating to shape of a plurality of arcs based on apertures of a plurality of lens groups contained in the photographing optical system (refer to FIG. 13A-FIG. 13D, to FIG. 17, which will be described later). It is possible to calculate information on AF sensitivity in the camera body 20 by transmitting the AF operation parameters in the memory 13 to be camera body 20.

The controller 14 controls each section within the lens barrel 10 in accordance with control commands of a controller 40 within the camera body 20, in accordance with programs stored within the memory 13. The controller 14 carries out communication with the camera body 20, focus control within the optical system 11, aperture control etc. Using communication with the camera body 20, transmission of lens state information that has been acquired by the lens information acquisition section 12, and transmission of various information stored within the memory 13, is carried out.

The camera body 20 comprises an image sensor 21, signal extracting circuit 22, image processing circuit 23, display 24, recorder 25, vibration prevention section 26, AF sensitivity computation section 27, body memory 28, luminance correction section 29, two-image interval computation section 30, lens control amount calculate section 31, and controller 40.

The image sensor 21 is an image sensor such as a CMOS image sensor or CCD image sensor, and is arranged in the vicinity of an imaging position for a subject image formed by the optical system 11. The image sensor 21 is made up of the previously described imaging pixels, and L pixels and R pixels that are focus detection pixels. Accordingly, this image sensor has imaging pixels and pairs of focus detection pixels. The image sensor 21 subjects a subject image to photoelectric conversion, and outputs a photoelectric conversion signal to a signal extraction circuit 22.

The signal extraction circuit 22 extracts and outputs an image signal from output of the image sensor 21. This image signal contains not only an image signal based on output of imaging pixels N, but also an L image signal based on output of the L pixels hand and an R image signal based on output of the R pixels. The signal extraction circuit 22 outputs the captured image signal to an image processing circuit 23, as well as outputting the L image signal and the R image signal that are based on outputs of the focus detection pixels (L pixels and R pixels) to the luminance correction circuit 29.

The image processing circuit 23 carries out specific image processing, for example, color signal generation processing and matrix conversion processing, and various other signal processing, on the image signal from the signal extraction circuit 22. The image processing circuit 23 outputs an image signal after processing to the display 24, and a taken image is displayed. The image processing circuit 23 also applies encoding processing to the image signal after processing and outputs compressed image information to the recorder 25, and this image information is recorded.

A card interface, for example, may be adopted as the recorder 25, and the recorder 25 is capable of recording image information and audio information etc. to a memory card or the like. The recorder 25 camera can also read out image information and audio information that has been recorded on a recording medium, and supply the read out information to the image processing circuit 23. The image processing circuit 23 can acquire an image signal and an audio signal by decoding image information and audio information from the recorder 25.

Movement such as hand shake that has been applied to the camera body 20 is detected by a sensor such as a gyro, and the vibration prevention section 26 has an image stabilize mechanism for driving the image sensor 21 within a plane that is perpendicular to the optical axis of the optical system 11 so as to counteract this movement (this operation is called a vibration operation). Also, at the time of the image stabilize operation, information relating to movement amount of the image sensor 21 (ΔIS in FIG. 8) is output to the AF sensitivity computation section 27.

As has been described above, AF sensitivity computation section 27 is used when obtaining AF sensitivity in order to calculate defocus amount. Specifically, if AF sensitivity is made n and two-image interval is made A, then defocus amount Def can be represented by Def=α×A. The AF sensitivity computation section 27 is input with movement amount of the image sensor 21 ΔIS from the vibration prevention section 26, lens state information from the lens information acquisition section 12 within the lens barrel 10, and lens information (information on arcs constituting a pupil) from the memory 13. Angular displacement information of an oblique-incidence characteristic at the time of manufacture of the image sensor 21 is also input to the AF sensitivity computation section 27 from the body memory 28.

The body memory 28 is an electrically rewritable nonvolatile memory such as flash memory, and stores the above described angular displacement information (Δθ) of an oblique-incidence characteristic at the time of manufacture of the image sensor 21. AF sensitivity for each Up, corresponding to angle of emergence $\theta_U$ of an upper ray of light flux to a ranging position, and Lo, corresponding to angle of emergence $\theta_L$, of a lower ray, as shown in FIG. 8B, are also stored in the body memory 28. The body memory 28 functions as a second memory for storing information on a light receiving sensitivity characteristic of the focus detection pixels. Besides these items of information, various adjustment values within the camera body 20 and programs for control by the controller 40 etc. are also stored.

Each item of information output from the lens barrel 10 to the AF sensitivity computation section 27 is temporarily stored in the body memory 28 and may be output to the AF sensitivity computation section 27 as required. The AF sensitivity computation section 27 obtains incident angle range of light flux based on these items of information, and the AF sensitivity and the luminance correction value calculated by performing operations in accordance with the sensitivity characteristic of the AF pixels.

The luminance correction circuit 29 acquires an L image signal and an R image signal from the signal extraction circuit 22, and a luminance correction value from the AF sensitivity computation section 27, and carries out luminance correction on the L image signal on the R image signal. Imbalance between received light amounts of the L image signal and the R image signal, such as is shown in FIG. 4 and FIG. 5, caused by positional offset between micro-lenses of the image sensor 21 and the focus detection pixels, is corrected by this luminance correction.

Using a known calculation method, the two-image interval computation circuit 30 obtains a two-image interval from the L image signal on the R image signal that have been subjected to luminance correction, and outputs the two-image interval to the lens control amount calculate section 31.

The lens control amount calculate section 31 calculates a defocus amount using the two-image interval from the two-image interval computation circuit 30 and information on the AF sensitivity from the AF sensitivity computation section 27. Since the information on AF sensitivity corresponds to image height, the lens control amount calculate section 31 can calculate defocus amount with high precision even in a case where two-image interval is obtained using off-axis focus detection pixels. This calculated defocus amount is output to the controller 14 within the lens barrel 10, and the controller 14 carries out automatic focus adjustment control by controlling the optical system 11 based on this defocus amount.

The AF sensitivity computation section 27 functions as a control amount calculate section for calculating information for focus adjustment control based on information that has been read out from the first memory and the second memory.

This control amount calculate section determines a boundary for incident angle range based on information relating to shape of a plurality of arcs. Incident angle range is a portion where overlapping circles constitute the arcs. The control amount calculate section also obtains received light amount by integrating light receiving sensitivity within a boundary within an incident angle range of light flux that is incident on focus detection pixels, based on a light receiving sensitivity characteristic of the focus detection pixels, then calculates barycentric position of the received light amount, and calculates AF sensitivity, for converting phase difference detection information that has been acquired based on output of the focus detection pixels to defocus amount for the lens barrel, based on an interval between barycentric positions of paired focus detection pixels (refer to #13 in FIG. 11 and S9 in FIG. 12).

The controller 40 controls each section of the camera body 20. For example, the controller 40 detects user operation of various switches provided in the chassis of the camera body 20, such as, for example a photographing mode setting switch, and of a release button, etc. for carrying out shooting, and controls each section based on user operation.

Figure 11:
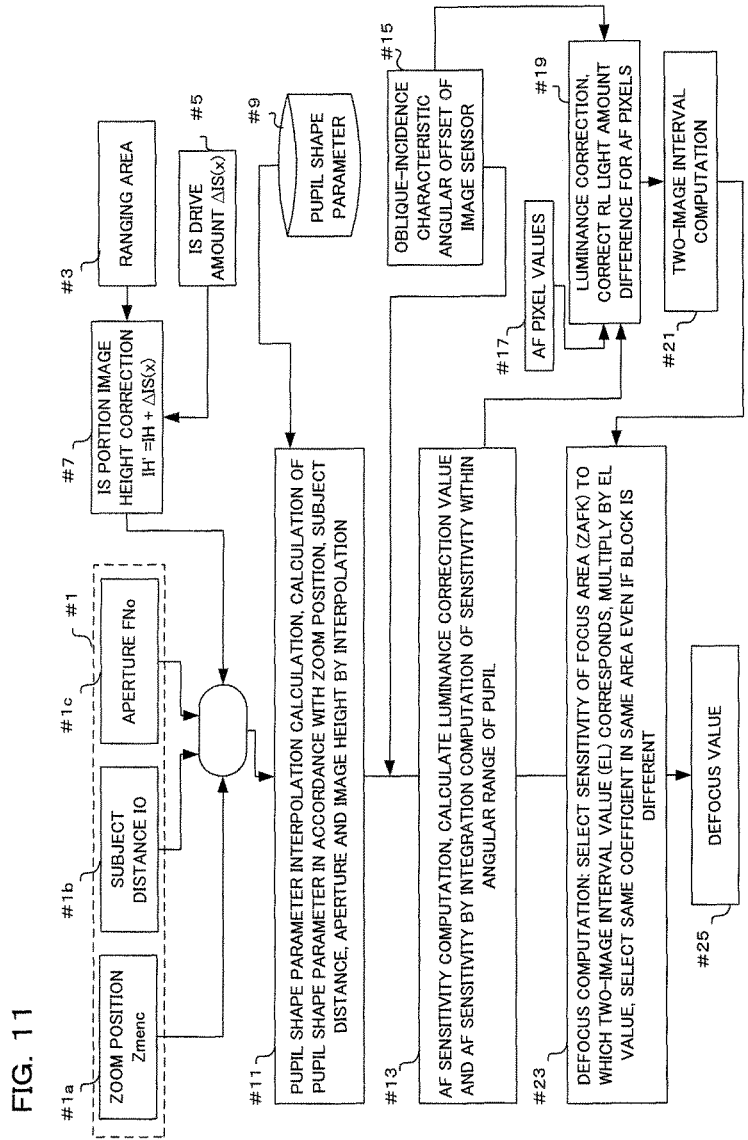
FIG. 11 shows flow of processing for calculating defocus amount for a camera of one embodiment of the present invention.

Next, processing flow for defocus amount calculation will be described using the processing flow diagram shown in FIG. 11. First, zoom position information (ZMENC) (#1a), subject distance information (IO) (#1b), and aperture value information (F value) (#1c) are acquired from the lens information acquisition section 12 within the lens barrel 10, and output to the AF sensitivity computation section 27 within the camera body 20 (#1).

Also, the vibration prevention section 26 within the camera body 20 acquires IS drive amount ΔIS(x) (#5). Specifically, when the vibration prevention section 26 carries out an image stabilize operation, information relating to movement amount of the image sensor 21 (ΔIS shown in FIG. 8A) is acquired. The controller 40 also acquires ranging area (#3). The ranging area is determined based on position of a face that has been detected by the image processing circuit 23, or a position that has been designated by the photographer using operation members, etc.

The controller 40 carries out IS portion image height correction using ranging area and IS drive amount ΔIS(x) (#7). Here, correction of image height is carried out in accordance with the above described equation (7), IH'=IH+ΔIS. Specifically, destination position on the optical system before movement is calculated from the fact that an area on the image sensor 21 corresponding to a determined ranging area moves as a result of an image stabilize operation, and this position is output to the AF sensitivity computation section 27.

A pupil shape parameter corresponding to lens state is stored in the memory 13 within the lens barrel 10 (#9), and this data is read out and output to the AF sensitivity computation section 27 camera body 20.

The AF sensitivity computation section 27 is input with lens information on the lens barrel 10 that has been acquired by #1, IS portion image height correction value that was calculated in #7, and data stored in the memory 13, and carries out pupil shape parameter interpolation calculation (#11). Here, a pupil shape parameter used in calculation is obtained using a pupil shape parameter stored in the memory 13, based on zoom position, subject distance and aperture value that were acquired in #1 and image height that was calculated in #7. Interpolation calculation is carried out because the data stored in the memory 13 is discrete values.

Since information on angular displacement of an oblique-incidence characteristic at the time of manufacture of the image sensor 21 (Δθ) is stored in the body memory 28 within the camera body 20, the AF sensitivity computation section 27 calculates $\theta_U+\Delta\theta$, $\theta_L+\Delta\theta$ using this angular displacement information Δθ.

Pixel values (#17) of the R pixels and the L pixels from the signal extraction circuit 22, and angular displacement information of the oblique-incidence characteristic of the image sensor (#15) is output to the luminance correction circuit 29, and luminance correction is carried out in parenthesis (#19). Here, a difference in light amount between right openings and left openings of the focus detection pixels (AF pixels) is corrected using the luminance correction value from the AF sensitivity computation section 27.

Pixel values of the focus detection pixels that have been subjected to luminance correction are output to the two-image interval computation circuit 30, where two-image interval calculation is carried out (#21). Here, a two-image interval (EL) between R pixel rows and L pixel rows is calculated using known phase difference AF.

The lens control amount calculate section 31 is input with the AF sensitivity def_el that was calculated in #13 and the two-image interval (EL) that was calculated in #21, and carries out defocus calculation (#23). Here, an AF sensitivity (ZAFK) of a ranging area corresponding to the two-image interval value (EL) is selected, and defocus amount is obtained by multiplying this AF sensitivity by the EL value. It should be noted that the same coefficient is selected for the same area, even if a plurality of blocks into which the inside of the area has been divided are different. Once the defocus amount has been obtained by this calculation (#25), it is output to the controller 14 within the lens barrel 10, and the controller 14 carries out drive control of a focus lens within the optical system 11 to a focus position.

In this way, with this embodiment, an incident angle range to the focus detection pixels is obtained from a pupil shape parameter in accordance with image height position that was corrected based on output of the vibration prevention section 26 (refer to #5), and AF sensitivity and luminance correction value are calculated by making the incident angle range conform to a light receiving sensitivity characteristic for the focus detection pixels that is stored in the body memory 28. As a result, it is possible to correct information (AF sensitivity) in accordance with this image height even in a case where the image sensor 21 has moved within a vertical plane of the optical system 11 due to an image stabilize operation, for example, and it is possible to obtain an accurate defocus amount.

Also, with this embodiment, the memory 13 within the lens barrel 10 stores information relating to incident angle and angular range of light flux that is incident on the focus detection pixels (pupil shape parameter), and the body memory 28 within the camera body 20 stores information relating to characteristics of the focus detection pixels. As a result, when calculating information for focus adjustment (defocus amount), it is possible to obtain an accurate defocus amount since it is possible to subject respective information to respective processing even in a case where information at the lens barrel 10 side and information at the camera body 20 is complex.

Figure 12:
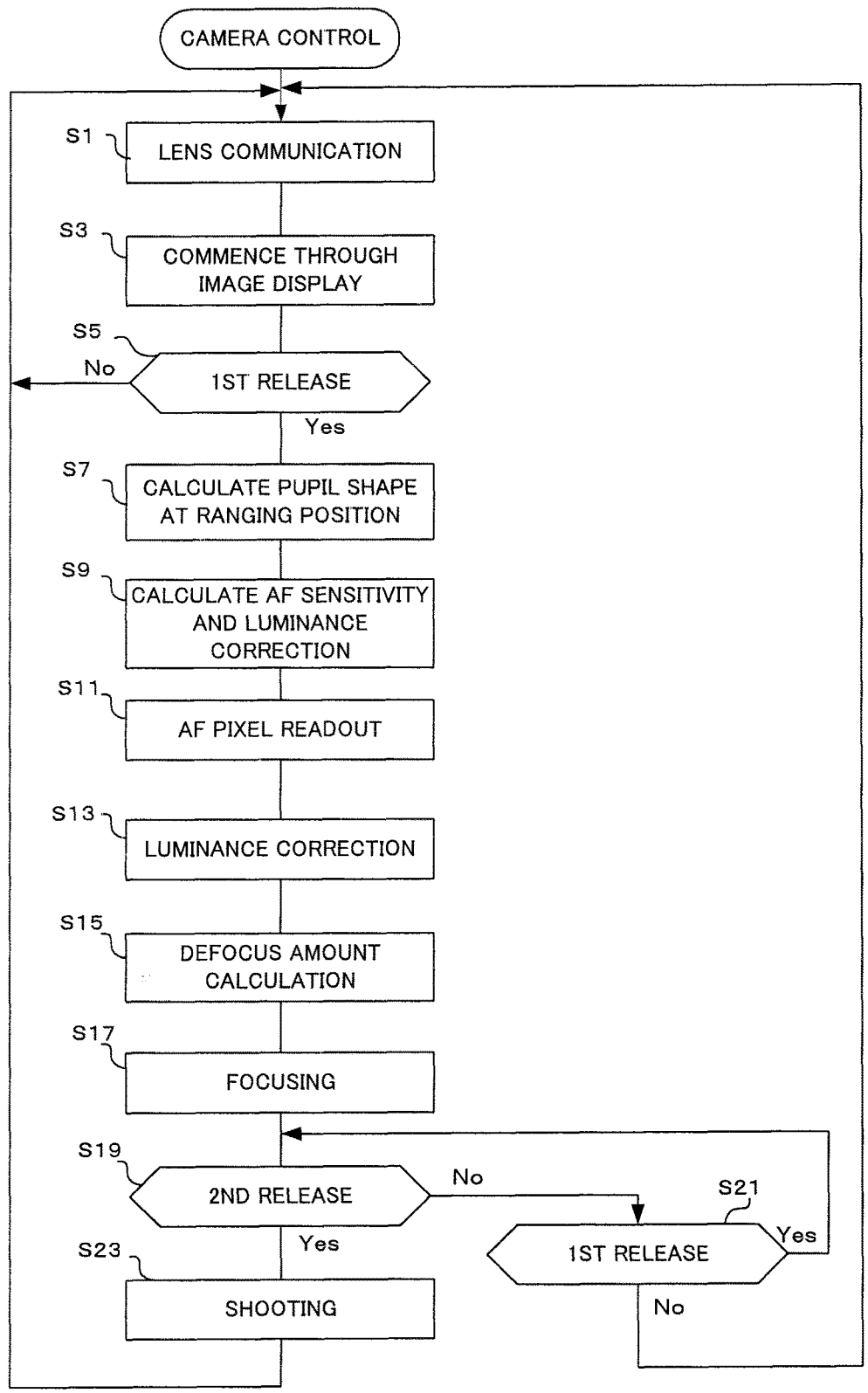
FIG. 12 is a flowchart showing operation of the camera of one embodiment of the present invention.
Figure 13:
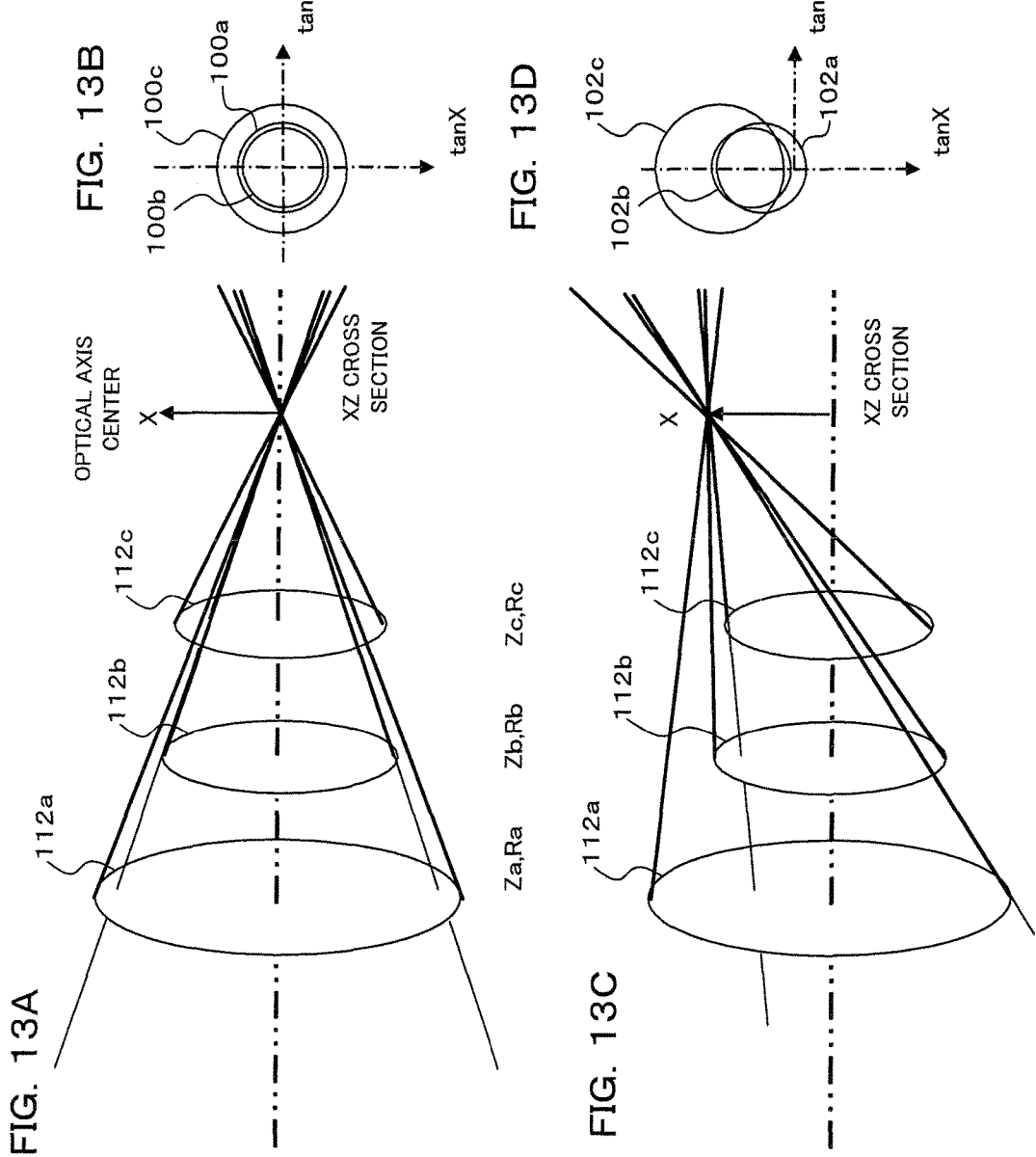
FIG. 13A to FIG. 13D are cross sectional drawings showing shape of a pupil along the optical axis of the optical system in a case where there are a plurality of apertures in the optical system, for the camera of one embodiment of the present invention.

Next, overall control of the camera of this embodiment will be described using the flowchart shown in FIG. 12. This processing flow is executed by the controller 40 controlling the controller 14 within the lens barrel 10 and each section within the camera body 20 in accordance with programs stored in the body memory 28.

If power supply to the camera is turned on, the controller 40 carries out lens communication (S1). Here, lens state information is acquired from the lens information acquisition section 12, and pupil shape parameter etc. is acquired from the memory 13 as lens information. Lens communication is carried out periodically as well as in this step, or communication is undertaken between the controller 40 and the controller 14 as required.

If lens communication has been carried out, next through image display is carried out (S3). A taken image (through image) is subjected to live view display on the display 24 based on an image signal from the image sensor 21.

Once through image display has been carried out, it is next determined whether or not a 1st release has been performed (S5). Here, the controller 40 performs determination based on the state of a 1st release switch that is linked to a release button being pressed down half way. If the result of this determination is that a 1st release has not been performed, processing returns to step S1.

If the result of determination step S5 is that a 1st release has been formed, a pupil shape corresponding to light flux at a ranging position is calculated (S7). Here, the AF sensitivity computation section 27 obtains a pupil shape parameter using zoom position, subject distance, aperture and image height that has been subjected to IS portion image height correction, and data from the memory 13, and calculates pupil shape of light flux to the ranging position from these values (refer to #11 #13 in FIG. 11).

If pupil shape has been calculated, next AF sensitivity is calculated (S9). Here, the AF sensitivity computation section 27 obtains AF sensitivity and luminance correction value from pupil shape of light flux to corrected ranging position that was obtained in step S7 and sensitivity characteristic of the focus detection pixels stored in the body memory 28, based on sensitivity characteristic for a pupil shape range (refer to #13 in FIG. 11). When obtaining AF sensitivity, pupil shape is obtained and AF sensitivity is calculated using this pupil shape, as will be described later using FIG. 13A to FIG. 16.

Once AF sensitivity and luminance correction value have been calculated, next an AF image is read out (S11). Here, the signal extraction circuit 22 reads pixel values of focus detection pixels (R pixels and L pixels) from within pixel values that have been read out from the image sensor 21.

Once the AF image has been read, next luminance correction is carried out (S13). Here, luminance correction is carried out for focus detection pixel values that were read in step S11, using the luminance correction value that was calculated in step S9 (#13 in FIG. 11) and oblique-incidence angular displacement information at the time of manufacture of the image sensor 21 stored in the body memory 28 (refer to #19 in FIG. 11).

If luminance correction has been carried out, next defocus amount calculation is carried out (S15). Here, the two-image interval computation circuit 30 calculates a two-image interval between the L pixel values and the R pixel values, using the focus detection pixel values that have been subjected to luminance correction. The lens control amount calculate section 31 calculates defocus amount using this calculated two-image interval and AF sensitivity that was calculated by the AF sensitivity computation section 27 (for to #23 in FIG. 11).

Once defocus amount has been calculated, next focusing is carried out (S17). Here, the defocus amount that was calculated in step S15 is transmitted to the controller 14 within the lens barrel 10, and the controller 14 performs drive control based on the defocus amount so that a focus lens reaches a focus position.

Once focusing has been carried out, it is next determined whether or not a 2nd release has been performed (S19). Here, the controller 40 performs determination based on the state of a 2nd release switch that is linked to the release button being pressed down fully.

If the result of determination step S19 is that the 2nd release has not been performed, then, similarly to step S5, it is determined whether or not a 1st release has been performed (S21). If 1st release has been performed, the determinations of steps S19 and S21 are repeated. On the other hand, in the event that 1st release has not been performed, it is a state where a finger has been removed from the release button and the half pressing of the release button has been released, and processing returns to step S1.

If the result of determination in step S19 is that the 2nd release has been performed, shooting is carried out (S23). At the time of shooting, a focus adjustment operation is completed using the AF sensitivity that has been corrected in accordance with image height, and a subject is focused on. Once shooting has commenced, the image sensor 21 is exposed for a shutter time, and once the shifted time has elapsed pixel values are read out from the image sensor 21 and pixel values of imaging pixels are extracted by the signal extraction circuit 22. After the extracted pixel values have been subjected to image processing by the image processing circuit 23, they are stored in a memory 24. Once shooting is completed, processing returns to step S1.

Next, a pupil shape calculation method of this embodiment will be described. Pupil shapes of light flux that is incident at a position off the optical axis are shown in FIG. 9A and FIG. 9B.

As shown in FIG. 9A and FIG. 9B, deformation in pupil shape arises due to vignetting of the pupil. Factors causing this pupil vignetting will be described using the model shown FIG. 13A to FIG. 13D. With this embodiment, the shape of a pupil is made almost the same as the actual shape of a pupil using a model that defines a pupil with a plurality of overlapping circles.

FIG. 13A to FIG. 13D show appearance of deformation in shape of an apparent pupil with vignetting of light flux that is incident at a position that is off the optical axis of an imaging surface, using a plurality of diaphragms. FIG. 13A and FIG. 13C are drawings viewing a plane including the optical axis, while FIG. 13B and FIG. 13D are drawings showing angular range (pupil shape) of light flux on an axis that is parallel to the optical axis. Light flux is shielded by lens frames etc. within the photographing optical system, which is effectively the same as there being a plurality of diaphragms arranged. With the example shown in FIG. 13A, when looking from the optical axis, three apertures 112a, 112b and 112c are arranged at apparent positions Za, Zb and Zc and with shapes of apparent radius Ra, Rb and Rc.

Shapes of apparent pupils viewed on the optical axis are determined by diameter of a bright aperture. The shapes of the pupils become circles with centers of tan x, tan y=0,0 (FIG. 13B). Specifically, apparent pupils viewed from on the optical axis are pupils 100a, 100b and 100c. A coordinate system for apparent pupils is indicated using tan X axis, tan Y axis, in order to express light flux angle. Light flux perpendicular to an observation point on the imaging surface is shown using a coordinate system of angle 0, that is, taking tan X=0, tan Y=0 as an origin. As shown in FIG. 13A and FIG. 13B, centers of the pupils 100a, 100b and 100c of the apertures 112a, 112b and 112c are all at the origin position.

The shape of an apparent pupil when a pupil viewed from a position that is off the optical axis of the imaging surface generally becomes a shape that is deformed by vignetting of light flux due to an aperture other than a bright aperture (inner diameter of a lens frame, inner diameter of a flared aperture). If a pupil is viewed from position X that is off the optical axis, then since center positions of each aperture appear offset, other apertures that were hidden by the bright aperture will appear. Accordingly, at off optical axis position X, light flux is subjected to vignetting by such other apertures, and the shape of an apparent pupil is deformed (FIG. 13C and FIG. 13D).

Figure 14:
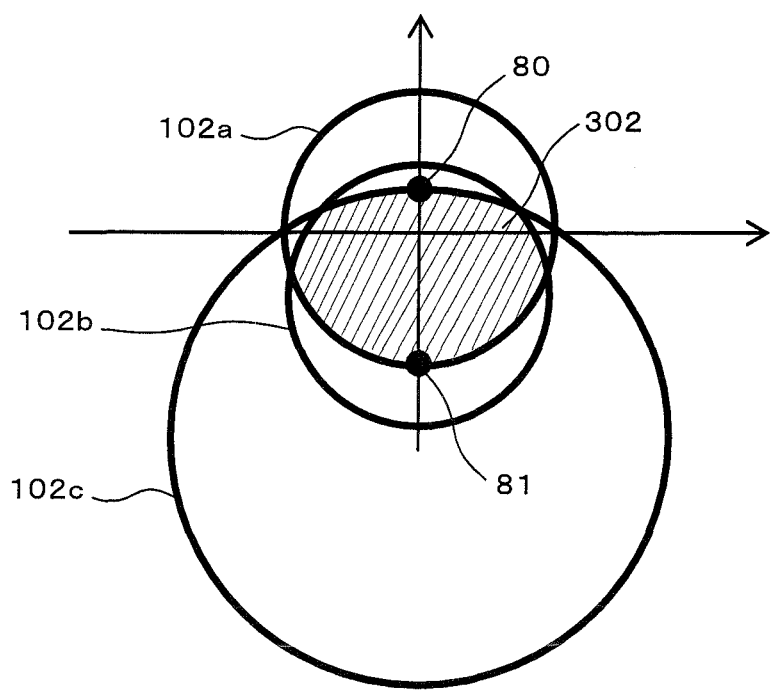
FIG. 14 is a plan view showing shape of a pupil, when there are a plurality of opening sections for determining range of light flux in the optical system, at a surface that is perpendicular to the optical axis of the optical system.

With the example shown in FIG. 14, which is an enlargement of FIG. 13D, a case where a pupil is viewed from an off optical axis position X is shown. With this example, apparent pupils corresponding to three apertures 112a, 112b and 112c respectively become 102a, 102b and 102c. A pupil corresponding to light flux that is incident at the off optical axis position X is equivalent to light flux that has passed through without being subjected to vignetting by any of the three apertures 112a, 112b and 112c. Accordingly, a pupil corresponding to light flux that is incident at off optical axis position X is an opening portion enclosed by respective circles (three overlapping circles) of apparent pupils 102a, 102b and 102c corresponding to openings of three apertures, and is region 302 which is the sum of the three circular regions (a region where the three circles overlap). Also, points 80 and 81 show angular information 81 of a lower end of projected pupil 102a and angular information 80 of an upper end of projected pupil 102c. Upper end angular information 80 and lower end angular information 81 for the region 302 is also shown.

In this way, it will be understood that at an off optical axis position, light flux is subjected to vignetting by the plurality of apertures, and pupil shape is deformed. In a case where a ranging area is positioned off the optical axis, that is, when image height of a ranging area has changed, in order to carry out accurate focus adjustment it is necessary to calculate AF sensitivity taking into consideration deformation of pupil shape due to the fact that light flux is subjected to vignetting in this way, and in order to do that, pupil shape is accurately defined. With this embodiment, memory capacity is reduced and calculation precision for AF sensitivity is increased by calculating angular information for an effective pupil region with high precision, using pupil shape parameters such as angular information representing upper end (reference numeral 80 in FIG. 14) and lower end (reference numeral 81 in FIG. 14) of light flux when a pupil of a photographing lens is viewed from a position of a ranging area, stored for each ranging area.

Figure 15:
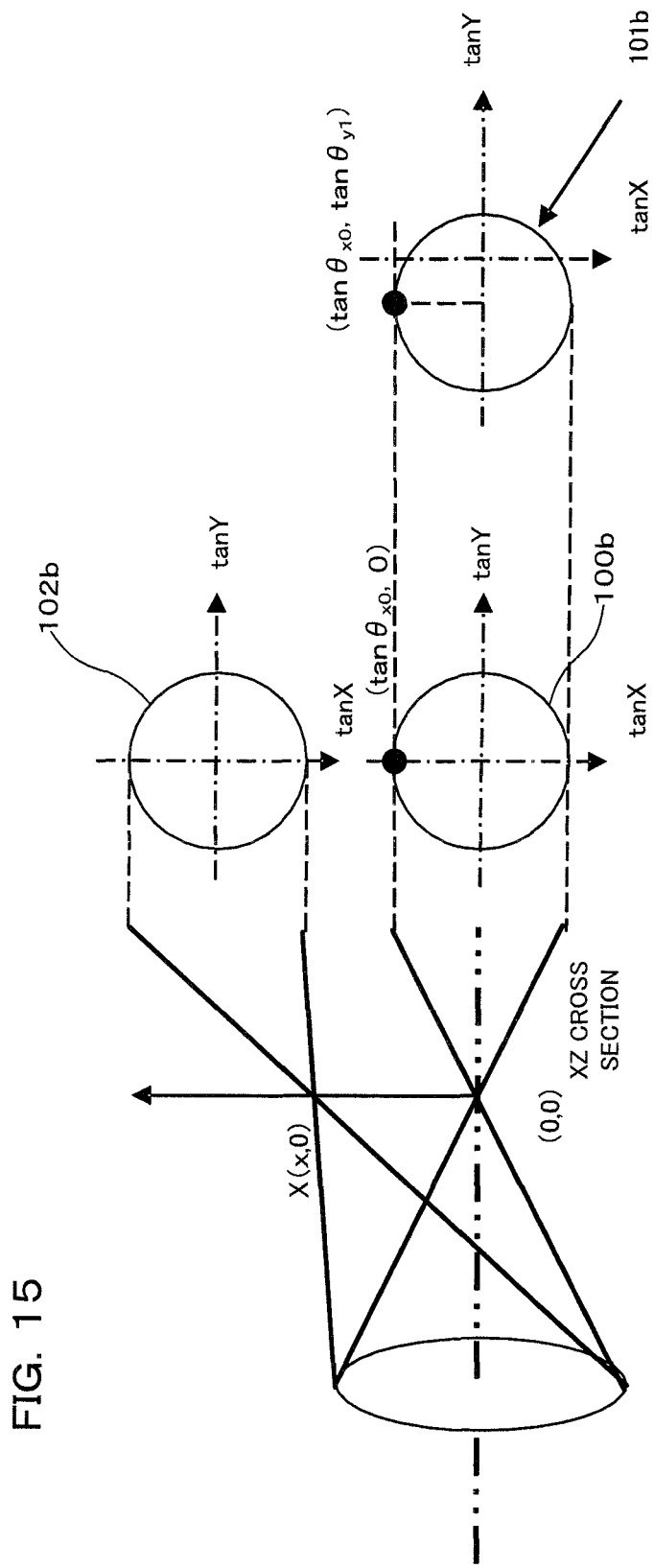
FIG. 15 is a drawing for explaining a relationship between an apparent pupil corresponding to ranging areas having image height, and an apparent pupil corresponding to ranging area on the optical axis.

FIG. 15 is a drawing for explaining a relationship between an apparent pupil corresponding to a ranging area having image height, and an apparent pupil corresponding to a ranging area on the optical axis. Here, description is given for a case where vignetting by other apertures and the effects of aberration are not take into consideration.

In a case where a pupil is viewed from image height X (coordinates (x, 0)), the size of an apparent pupil will not change even if image height X changes. Accordingly, the diameter of an apparent pupil 100b corresponding to a ranging point on the optical axis shown in FIG. 15, and the diameter of an apparent pupil 102b when a pupil is viewed from image height X, are the same. In this way, as long as the shape of an apparent pupil is determined by edges of the same aperture, the diameters (size) of apparent pupils respectively corresponding to coordinates (x, y) and coordinates (x, 0) will be equal.

Also, the x coordinate for position of an apparent pupil will not vary even if there is change in image height in the y direction. As shown in FIG. 15, a crossing point of a circle representing the outer shape of an apparent pupil 100b on the optical axis and the tan X axis is (tan $\theta_{x0}$, 0). Also, a point where a tangent that is parallel to the tan Y axis contacts a circle representing the outer shape of an apparent pupil 101b viewed from position (0, y) having image height Y, not shown, is represented by (tan $\theta_{x0}$, tan $\theta_{y1}$). That is, an apparent pupil corresponding to a position having an arbitrary image height can be expressed by parallel movement of a circle of the same size as a corresponding apparent pupil on the optical axis.

Figure 16:
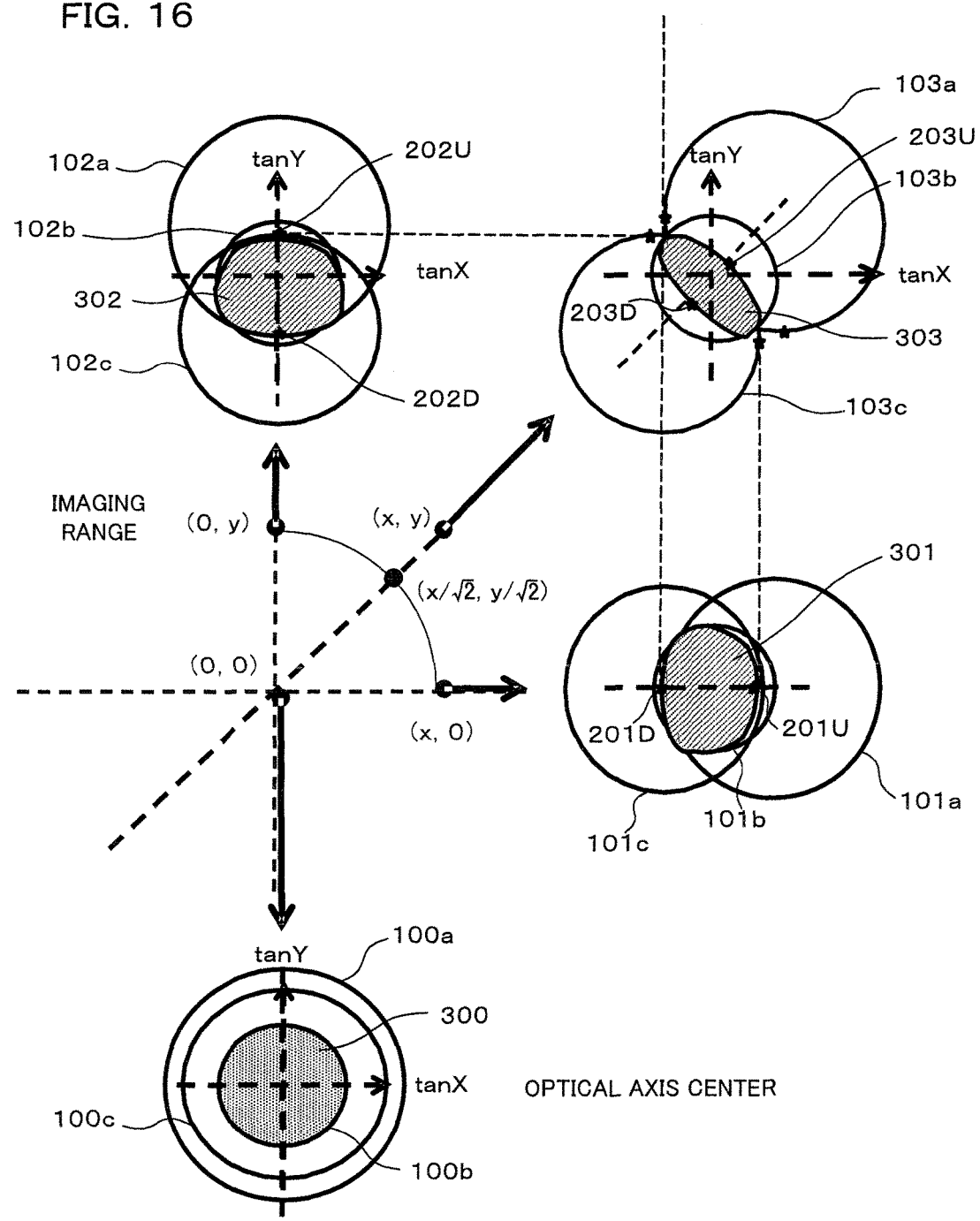
FIG. 16 is a drawing showing a relationship between arcs defining pupil shape for each image height, with the camera of one embodiment of the present invention.

Next, a procedure for determining effective pupil region formed by three overlapping circles will be illustrated using FIG. 16. Angular information Ra, Rb and Rc of apparent radii of apertures 112a, 112b and 112c corresponding to the projected pupils 100a, 100b and 100c shown in FIG. 13, and apparent positions Za, Zn and Zc, are stored in advance. These items of information are stored in the memory 13 of the lens barrel 10.

Angular information of apparent radii is for representing apparent angle from the imaging surface as a tangent (tan), without taking into consideration the fact that vignetting due to respective surfaces will determine light flux range (apertures 112a, 112b and 112c in FIG. 13C and FIG. 13D) on other surfaces. Also, apparent position Z becomes Z=X/tan θ, when a visual angle assumed to be the center of each surface from position X that is off the optical axis is made θ.

FIG. 16 is a pupil projection drawing corresponding to a position having an arbitrary image height. In the following description, an apparent pupil will be called a projected pupil. The projected pupils 100a, 100b and 100c represent projected pupils which are apparent pupils viewed from coordinate (0, 0) that is on the optical axis, and respectively correspond to apertures 112a, 112b and 112c (refer to FIG. 13C and FIG. 13D).

Also, projected pupils 103a, 103b and 103c are projected pupils corresponding to coordinate (x, y), and correspond to the respective plurality of apertures 112a, 112b and 112c. Pupil shape for position coordinate (x, y) that is off the optical axis becomes region 303 which is a product of the regions of the projected pixels 103a, 103b and 103c.

At this time, center coordinates (tan θxa, tan θya) of projected pupil 103a corresponding to aperture 112a are determined using equations (12) and (13) below.

$$\tan \theta xa = x/Za \quad (12)$$

$$\tan \theta ya = x/Za \quad (13)$$

The region of diameter Ra with this coordinate as a center becomes the region of the projected pupil 103a.

Since it is possible to similarly obtain regions for the projected pupils 103b and 103c, it is possible to define pupil shape using the region that is a product of the regions of the projected pupils represented by these three circles.

In this way, with the one embodiment of the present invention, apparent radius and position of a surface defining the light flux (surface corresponding to an aperture) are stored, and off optical axis pupil shape and position are calculated from this apparent radius and position. An effective projected pupil region is then obtained by calculating shape and position for a plurality of respectively corresponding projected pupils from information on the surface (aperture) defining a plurality of light fluxes, and overlapping them. Since it is possible to obtain shape and position of a projected pupil corresponding to a position that is off the optical axis by calculation, there is the advantage that information on an effective projected pupil region corresponding to each image height is not required, and memory capacity is reduced. Other hand, since position of an off axis pupil is calculated from apparent pupil position and image height, errors arise in the event that there are influences such as aberration of the optical system. Also, the control amount calculate section calculates coordinates of a plurality of projected pupils respectively corresponding to openings of a plurality of lens groups based on information relating to shape of a plurality of arcs, and coordinates of the plurality of projected pupil are compared to determine a boundary for incident angle range of light flux that is incident on focus detection pixels.

Next, a first modified example of obtaining pupil shape will be described. With this modified example, in order to alleviate the effect of aberration of the optical system on pupil range, three circles for defining pupil shape are obtained using information indicating angles of upper and lower ends of light flux and information on apparent radius of a pupil.

With this modified example, angular information Ra, Rb and Rc for apparent radii of projected pupils 100a, 100b and 100c, and information indicating angle of upper end 80 and lower end 81 of light flux at each image height, are stored in the memory 13. FIG. 16 is a pupil projection drawing corresponding to a position having an arbitrary image height. With this modified example also, an apparent pupil will be called a projected pupil.

The projected pupils 100a, 100b and 100c represent projected pupils which are apparent pupils viewed from coordinates (0, 0) that are on the optical axis, and respectively correspond to apertures 112a, 112b and 112c. Also, projected pupils 103a, 103b and 103c are projected pupils corresponding to coordinates (x, y), and correspond to the respective plurality of apertures 112a, 112b and 112c.

Pupil shape for position coordinate (x, y) that is off the optical axis becomes region 303, which is a product of the regions of the projected pixels 103a, 103b and 103c. Here, image height IH for position (x, y) that is off the optical axis is obtained using equation (14) below.

$$\text{image height } IH = \sqrt{(x^2 + y^2)} \quad (14)$$

Specifically, image height IH can be calculated using the square root of $(x^2+y^2)$ Also, position 203U and position 203D represent angular information for upper end and lower end of the light flux at image height IH, and are stored in the memory 13 as pupil shape parameters. At this time, an X component of a center coordinate (tan θxih, 0) of a projected pupil of light flux at position (IH, 0) that is on the X axis having the same image height IH can be obtained using equation (15) below. That is, if angular information 2039 for the lower end of the light flux at image height IH and angular information Ra of a radius are added, it will give angular information of the center.

$$\tan \theta xih = 203D + Ra \quad (15)$$

Accordingly, tan θxa of the center coordinates (tan θxa, tan θya) of a projected pupil 103a corresponding to position (x, y) is obtained from equation (16) below using angular information of the center at image height IH and a ratio of image height x to image height IH. tan θya is similarly obtained from equation (17) below.

$$\tan \theta xa = (203D + Ra) \times (x/IH) \quad (16)$$

$$\tan \theta ya = (203D + Ra) \times (y/IH) \quad (17)$$

A region of radius Ra with these coordinates (tan θxa, tan θya) as a center constitutes the region of the projected pupil 103a.

Center coordinates (tan θxa, tan θya) of the projected pupil 103c are similarly obtained from equations (18) and (19) below.

$$\tan \theta xa = (203U + Rc) \times (x/IH) \quad (18)$$

$$\tan \theta ya = (203U + Rc) \times (y/IH) \quad (19)$$

A region of radius Rc with these coordinates (tan θxa, tan θya) as a center constitutes the region of the projected pupil 103c.

Further, center coordinates (tan θxa, tan θya) of the projected pupil 103b are obtained from equations (20) and (21) below.

$$\tan \theta xa = x/EXPI \quad (20)$$

$$\tan \theta ya = y/EXPI \quad (21)$$

A region of radius Rb with these coordinates (tan θxa, tan θya) as a center constitutes the region of the projected pupil 103b. EXPI represents exit pupil position viewed from the image plane, and is stored in the memory 13 as a pupil shape parameter.

With this modified example also, it is possible to define pupil shape by a region that is a product of the three circular regions of projected pupils 103a, 103b and 103c. With this modified example, it is possible to define pupil shape with high precision, since it is possible to also incorporate consideration of the effects of aberration by using angular information of the upper and lower ends of the light flux. In this way, with this modified example, the control amount calculate section calculates coordinates of a plurality of projected pupils respectively corresponding to openings of a plurality of lens groups based on angular information of upper and lower ends of a plurality of imaging light fluxes of different image heights, and apparent diameters of the openings of the plurality of lens groups, and calculates incident angle range of light flux that is incident on the focus detection pixels by comparing the plurality of projected pupil coordinates.

Next, a second modified example of obtaining pupil shape be described. With the one embodiment and the first modified example of the present invention, description was given for a case where angular information for radii of projected pupils 100a, 100b and 100c were stored. However even in a case where angular information for radii of projected pupils 100a, 100b and 100c is not stored, this information can be calculated using the method described in the following FIG. 16 shows pupil shapes for three positions of coordinates (x, 0), (0, y) and (x, y), and circles (301, 101a, 101b, 101c, 302, 102a, 102b, 102c, 303, 103a, 103b and 103c) for defining the pupil shape. Here, description will be given with projected pupil 103 as an example.

The projected pupil 103a results from moving projected pupils 101a and 102a parallel to a tan Y axis and a tan X axis, respectively. Also, angular information of radii of the projected pupils becomes the same for each of the projected pupils 101a, 101b and 101c, namely a value Ra. Positions of the left end 201D of the projected pupil 101a and the lower end 202D of the projected pupil 102a are respectively given by data for the lower-end of light flux of image height x and image height y (corresponding to the lower end 81 in FIG. 14). Also, the lower end 203D of the projected pupil 103a in an optical axis direction is given as data for the lower end of light flux of image height $\sqrt{(x^2+y^2)}$ (refer to equation (14)).

A specific calculation method for calculating angular information Ra or radius of the projected pupil 103a will be described FIG. 17.

Figure 17:
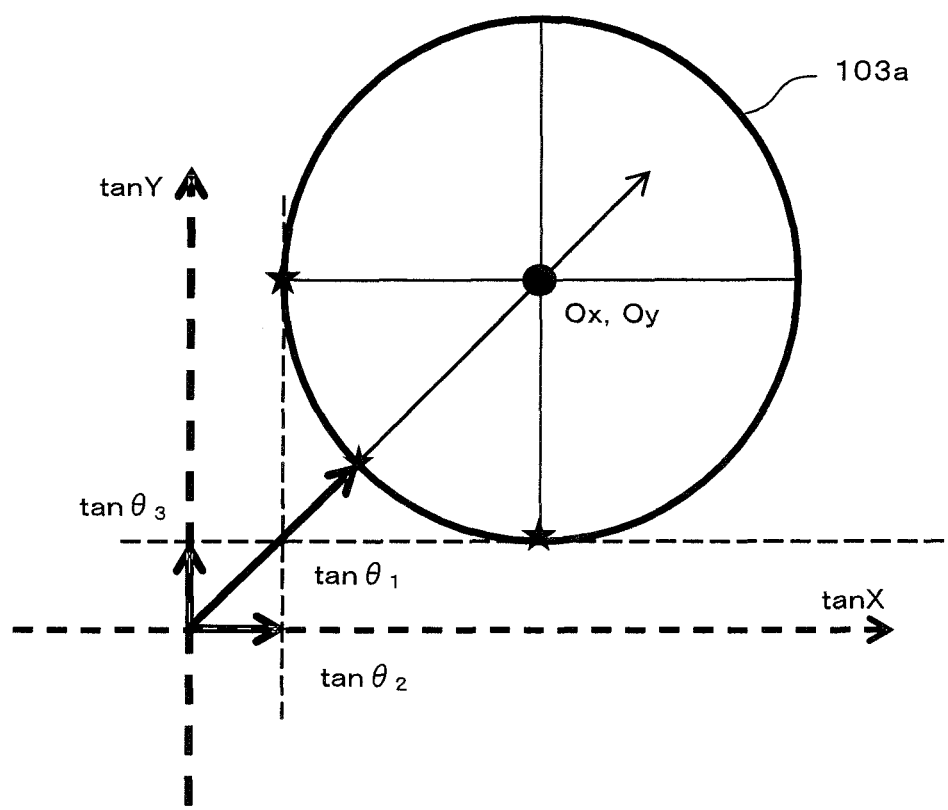
FIG. 17 is a drawing for explaining calculation of angular information Ra of a radius of a projected pupil 103a, for a camera of a second modified example of the one embodiment of the present invention.

As shown in FIG. 17, if angular information for center of the projected pupil 103a is made (Ox, Oy), then angular information tan θ₂ of a left end is equal to angular information 201D of a lower end of projected pupil 101a shown in FIG. 16, and can be referenced as angular information of image height X (coordinates (x,0)). Equation (22) is then established for angular information Ra for a radius.

$$Ra = Ox - \tan \theta_2 \quad (22)$$

Next angular information tan θ₃ for the lower end of projected pupil 103a shown in FIG. 17 is equal to angular information 202D of the lower end of projected pupil 102a shown in FIG. 16, and can be referenced as angular information of image height Y (coordinates (0, y)). Equation (23) is then established for angular information Ra for a radius.

$$Ra = Oy - \tan \theta_3 \quad (23)$$

Finally, angular information θ₁ for the optical axis direction of the projected pupil 103a can be referenced as angular information of image height $\sqrt{(x^2+y^2)}$. Equation (24) is then established for angular information Ra for a radius.

$$Ra = \sqrt{(Ox^2 + Oy^2)} - \tan \theta_1 \quad (24)$$

In equation (24), $\sqrt{(Ox^2 + Oy^2)}$ means the square root of $Ox^2 + Oy^2$)

The above equations (22), (23) and (24) all relate to Ra, and it is possible to obtain radius Ra by solving the simultaneous equations.

Here, if conditions giving Ox=Oy are considered, then since tan θ₂=tan θ₃ the following equations (23') and (24') are obtained.

$$Ra = Ox - \tan \theta_2 \quad (23')$$

$$Ra = \sqrt{2} \times Ox - \tan \theta_1 \quad (24')$$

In equation 24', √2 means the square root of 2.

Equation (25) is derived from equations (23') and 24').

$$Ra = \sqrt{2}(\sqrt{2}-1) \times \tan \theta_2 + (1/\sqrt{2}-1)) \times \tan \theta_1 \quad (25)$$

In this manner, with this modified example it is possible to calculate angular information Ra for a radius of the projected pupil 103a. As a result of having calculated angular information Ra for the radius, based angular information tan θ₁ for the lower end of the projected pupil 103a and angular information Ra for the radius of the projected pupil 103a, it is possible to obtain a circle 103a constituting the outer shape of the projected pupil 103a having angular information Ra of a radius passing through the lower end 203D of the projected pupil 103a in FIG. 16.

Using the same method, if angular information for the center of the projected pupil 103c is made (Ox, Oy) (Ox=Oy), it is possible to calculate angular information Rc for radius of the projected pupil 103c based on angular information of the upper end of the projected pupil 101c and angular information corresponding to the upper end of the projected pupil 103c. It is then possible to obtain a circle 103c constituting the outer shape of the projected pupil 103c having angular information Rc for a radius that passes through the upper end 203U of the projected pupil 103c in FIG. 16.

Finally, since the projected pupil 103b has the same diameter as a pupil 100b on the optical axis, it can be referenced as angular information for image height 0 (coordinates (0,0)). Also, since the coordinates (tan θxa, tan θya) of the projected pupil 103b can be obtained from equations (26) and (27) below.

$$\tan \theta xa = x/EXPI \quad (26)$$

$$\tan \theta ya = y/EXPI \quad (27)$$

A region of radius Rb with these coordinates (tan θxa, tan θya) as a center constitutes the region of the projected pupil 103b. EXPI represents exit pupil position viewed from the image plane.

If the circle (projected pupil) 103a, circle (projected pupil) 103c and circle (projected pupil) 103b are obtained, it is then possible to obtain a region that is a product of overlapping these circles (projected pupils) as an effective pupil region 303. Once the effective pupil region 303 has been obtained, it is possible to calculate AF sensitivity using this pupil region 303.

As has been described above, with the one embodiment and the modified examples of the present invention, a memory 13 for storing information relating to incident angle range of imaging light flux is provided in the lens barrel 10, and information relating to incident angle range includes information relating to shape of a plurality of arcs based on openings of a plurality of lens groups included in the photographing optical system. Also, a body memory 28 for storing information on light receiving sensitivity characteristic of focus detection pixels is provided in the camera body 20, and information for focus adjustment control is calculated based on information that has been read out from these two memories (refer to FIG. 11 and FIG. 12).

With the one embodiment and the modified examples of the present invention, description has been given for an example where the plurality of apertures are three apertures. However, the number of apertures in the one embodiment of the present invention is not limited to three, and maybe two, or maybe four or more. Shape of a projected pupil is obtained in accordance with a number of respective apertures, and an effective pixel region may be obtained from overlapped regions to obtain AF sensitivity.

Also, with the one embodiment and the modified examples of the present invention, the signal extraction circuit 22, image processing circuit 23, AF sensitivity computation section 27, luminance correction circuit, two-image interval computation circuit 30, and lens control amount calculate section 31 etc. are configured separately from the controller 40, but some or all of the sections they be configured as software, and executed by the controller 40.

Further, with this embodiment, an apparatus for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal (PDA: Personal Digital Assistant), personal computer (PC) tablet type computer, game console etc. In any event, it is possible to adopt the present invention to any apparatus that carries out focus adjustment based on data from an image sensor having paired focus detection pixels.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As will be understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A photographing apparatus, having a lens barrel including a photographing optical system for guiding photographing light flux and a camera body capable of being attached to and detached from the lens barrel, comprising:
   an image sensor having imaging pixels and pairs of focus detection pixels,
   a first memory, provided in the lens barrel, for storing information relating to incident angle range of imaging light flux on the image sensor,
   a second memory, arranged in the camera body, for storing information on light receiving sensitivity characteristics of the focus detection pixels, and
   a control amount calculate section for calculating information for focus adjustment control based on information that has been read out from the first memory and the second memory,
   wherein
   information relating to incident angle range includes information relating to shape of a plurality of arcs based on openings of a plurality of lens groups contained in the photographing optical system, and
   the control amount calculate section calculates incident angle range for light flux incident on the focus detection pixels based on the information relating to incident angle range.

2. The photographing apparatus of claim 1, wherein:
   the information relating to incident angle range includes apparent position and apparent diameter of openings of the plurality of lens groups.

3. The photographing apparatus of claim 1, wherein:
   the control amount calculate section calculates coordinates of a plurality of projected pupils respectively corresponding to openings of the plurality of lens groups based on information relating to shape of a plurality of arcs, and coordinates of the plurality of projected pupils are compared to determine a boundary for incident angle range of light flux that is incident on the focus detection pixels.

4. The imaging device of claim 3, wherein:
the control amount calculate section obtains received light amount by integrating light receiving sensitivity within the boundary of incident angle range for light flux that is incident on the focus detection pixels, based on a light receiving sensitivity characteristic of the focus detection pixels, calculates barycentric positions for the received light amount, and calculates AF sensitivity for converting phase difference detection information, that has been obtained based on output of the focus detection pixels, to a defocus amount for the lens barrel, based on an interval between the barycentric positions of the pairs of focus detection pixels.

5. The photographing apparatus of claim 1, wherein:
the information relating to incident angle range includes angular information of upper and lower ends of imaging light flux, and apparent diameter of openings of the plurality of lens groups.

6. The photographing apparatus of claim 5, wherein:
the control amount calculate section calculates coordinates of a plurality of projected pupils respectively corresponding to openings of a plurality of lens groups based on angular information of upper and lower ends of a plurality of imaging light fluxes of different image heights, and apparent diameters of the openings of the plurality of lens groups, and calculates incident angle range of light flux that is incident on the focus detection pixels by comparing the plurality of projected pupil coordinates.

7. The photographing apparatus of claim 6, wherein:
the control amount calculate section obtains received light amount by integrating light receiving sensitivity within the boundary of incident angle range for light flux that is incident on the focus detection pixels, based on a light receiving sensitivity characteristic of the focus detection pixels, calculates barycentric positions for the received light amount, and calculates AF sensitivity for converting phase difference detection information, that has been obtained based on output of the focus detection pixels, to a defocus amount for the lens barrel, based on an interval between the barycentric positions of the pairs of focus detection pixels.

8. A control method for a photographing apparatus that comprises
a lens barrel including a photographing optical system for guiding shooting light flux,
a camera body to which the lens barrel can be removably attached,
an image sensor having imaging pixels and pairs of focus detection pixels,
a first memory, provided in the lens barrel, for storing information relating to incident angle range of imaging light flux on the image sensor, and
a second memory, arranged in the camera body, for storing information on light receiving sensitivity characteristic of the focus detection pixels,
the control method comprising:
a control amount calculation step for calculating information for focus adjustment control based on information that has been read out from the first memory and the second memory,
wherein
the information relating to incident angle range includes information relating to shape of a plurality of arcs based on openings of a plurality of lens groups contained in the photographing optical system, and
the control amount calculation step calculates incident angle range for light flux incident on the focus detection pixels based on the information relating to incident angle range.

9. The control method for a photographing apparatus of claim 8, wherein:
the information relating to incident angle range includes apparent position and apparent diameter of openings of the plurality of lens groups.

10. The control method for a photographing apparatus of claim 8, wherein:
the control amount calculation step calculates coordinates of a plurality of projected pupils respectively corresponding to openings of the plurality of lens groups based on information relating to shape of a plurality of arcs, and compares coordinates of the plurality of projected pupils to determine a boundary for incident angle range of light flux that is incident on the focus detection pixels.

11. The control method for a photographing apparatus of claim 9, wherein:
the control amount calculation step obtains received light amount by integrating light receiving sensitivity within the boundary of incident angle range for light flux that is incident on the focus detection pixels, based on a light receiving sensitivity characteristic of the focus detection pixels, calculates barycentric positions for the received light amount, and calculates AF sensitivity for converting phase difference detection information, that has been obtained based on output of the focus detection pixels, to a defocus amount for the lens barrel, based on an interval between the barycentric positions of the pairs of focus detection pixels.

12. The control method for a photographing apparatus of claim 8, wherein:
the information relating to incident angle range includes angular information of upper and lower ends of imaging light flux, and apparent diameter of openings of the plurality of lens groups.

13. The control method for a photographing apparatus of claim 12, wherein:
the control amount calculation step calculates coordinates of a plurality of projected pupils respectively corresponding to openings of a plurality of lens groups based on angular information of upper and lower ends of a plurality of imaging light fluxes of different image heights, and apparent diameters of the openings of the plurality of lens groups, and calculates incident angle range of light flux that is incident on the focus detection pixels by comparing the plurality of projected pupil coordinates.

14. The control method for a photographing apparatus of claim 13, wherein:
the control amount calculation step obtains received light amount by integrating light receiving sensitivity within the boundary of incident angle range for light flux that is incident on the focus detection pixels, based on a light receiving sensitivity characteristic of the focus detection pixels, calculates barycentric positions for the received light amount, and calculates AF sensitivity for converting phase difference detection information, that has been obtained based on output of the focus detection pixels, to a defocus amount for the lens section, based on an interval between the barycentric positions of the pairs of focus detection pixels.

15. A non-transitory computer-readable medium storing a computer program for controlling a photographing apparatus, wherein the photographing apparatus comprises:
- a lens section including a photographing optical system for guiding shooting light flux,
- a body section to which the lens section can be removably attached,
- an image sensor having imaging pixels and pairs of focus detection pixels,
- a first memory, provided in the lens section, for storing information relating to incident angle range of imaging light flux on the image sensor, and
- a second memory, arranged in the body section, for storing information on light receiving sensitivity characteristic of the focus detection pixels, the computer program comprising:
- a control amount calculation step for calculating information for focus adjustment control based on information that has been read out from the first memory and the second memory, wherein
the information relating to incident angle range includes information relating to shape of a plurality of arcs based on openings of a plurality of lens groups contained in the photographing optical system, and
the control amount calculation step calculates incident angle range for light flux incident on the focus detection pixels based on the information relating to incident angle range.

\* \* \* \* \*